US008130488B2

(12) United States Patent
Sawai et al.

(10) Patent No.: US 8,130,488 B2
(45) Date of Patent: Mar. 6, 2012

(54) DISPLAY SCREEN TURNING APPARATUS AND TELEVISION SET

(75) Inventors: Kunio Sawai, Daito (JP); Daisuke Shimizu, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 377 days.

(21) Appl. No.: 12/436,501

(22) Filed: May 6, 2009

(65) Prior Publication Data
US 2009/0284668 A1 Nov. 19, 2009

(30) Foreign Application Priority Data

May 7, 2008 (JP) ................................. 2008-121164

(51) Int. Cl.
*H05K 7/14* (2006.01)

(52) U.S. Cl. ............... 361/679.22; 361/379.21; 248/371; 16/54

(58) Field of Classification Search .................. 361/681, 361/679.01, 679.21, 679.22, 679.26, 679.09, 361/679.02; 248/349.1, 371, 133, 291.1, 248/917–924; 16/386
See application file for complete search history.

(56) References Cited

U.S. PATENT DOCUMENTS

| 5,124,805 A | 6/1992 | Chung et al. |
| 5,715,138 A | 2/1998 | Choi |
| 2003/0142973 A1 | 7/2003 | Sawada |
| 2005/0268431 A1* | 12/2005 | Lo ................................... 16/239 |
| 2006/0171105 A1* | 8/2006 | Hsiao ............................. 361/681 |
| 2007/0215760 A1* | 9/2007 | Sawai et al. ................. 248/122.1 |
| 2008/0035821 A1 | 2/2008 | Kameoka et al. |
| 2008/0083293 A1* | 4/2008 | Sawai ....................... 74/412 TA |
| 2008/0100997 A1* | 5/2008 | Chen ............................. 361/681 |
| 2008/0185484 A9* | 8/2008 | Suzuki ....................... 248/125.7 |

FOREIGN PATENT DOCUMENTS

| EP | 2 112 419 A2 | 10/2009 |
| JP | 7-84530 A | 3/1995 |
| JP | 2007-293245 A | 11/2007 |
| JP | 2007 295476 A | 11/2007 |
| JP | 2007-334112 A | 12/2007 |

OTHER PUBLICATIONS

Japanese Office Action dated Feb. 16, 2010 including English translation (Three (3) pages).
European Search Report dated Apr. 12, 2010 (six (6) pages).
European Examination Report dated May 2, 2011 (four (4) pages).
Communication in European Patent Application No. 09 251 271.4-1252 dated Aug. 29, 2011.

* cited by examiner

*Primary Examiner* — Brian Glessner
*Assistant Examiner* — Beth Stephan
(74) *Attorney, Agent, or Firm* — Crowell & Moring LLP

(57) ABSTRACT

A display screen turning apparatus includes a display screen support member provided with a first gear and supporting a display screen portion rotatably in a horizontal plane and rotatably with respect to a vertical plane and a rack plate provided with a second gear meshing with the first gear, wherein the first gear meshed with the second gear moves by movement of the second gear following linear movement of the rack plate in the horizontal plane, thereby rotating the display screen support member in an anteroposterior direction by a prescribed angle with respect to the vertical plane.

19 Claims, 17 Drawing Sheets

DISPLAY SCREEN TURNING APPARATUS AND TELEVISION SET

BACKGROUND OF THE INVENTION

1. Field of the Invention

The present invention relates to a display screen turning apparatus and a television set, and more particularly, it relates to a display screen turning apparatus and a television set each comprising a display screen support member supporting a display screen portion.

2. Description of the Background Art

A display screen turning apparatus comprising a display screen support member supporting a display screen portion of a liquid crystal television or the like is known in general, as disclosed in Japanese Patent Laying Open Nos. 2007-334112, 2007-293245 and 2007-295476, for example.

A hinge apparatus (display screen turning apparatus) of a flat panel display disclosed in the aforementioned Japanese Patent Laying Open No. 2007-334112 comprises an anteroposterior tilting mechanism including a tilting support plate (display screen support member) supporting a lower portion of a flat panel display (display screen portion), a horizontal pivot provided below the tilting support plate and transmitting tilting (anteroposterior rotation by a prescribed angle with respect to a vertical plane) of the tilting support plate, a pair of coupling members provided in the vicinity of both ends of the horizontal pivot respectively and fixed on the horizontal pivot and the tilting support plate, and a plurality of friction discs provided on the both ends of the horizontal pivot and holding a tilting position of the tilting transmitted from the horizontal pivot. The hinge apparatus of the flat panel display further comprises a horizontal rotational mechanism including a rotating plate provided with the horizontal pivot on an upper surface, an operative gear fixed to a lower portion of the rotating plate and rotating the rotating plate in a horizontal direction in a horizontal plane, and a plurality of discs holding a rotational position of the operative gear through a small gear meshing with the operative gear. In this hinge apparatus of the flat panel display described in Japanese Patent Laying Open No. 2007-334112, when the flat panel display is manually tilted in the anteroposterior direction, the coupling members fixing the tilting support plate tilt and the tilting is transmitted to the friction discs by the horizontal pivot fixing the coupling members through the tilting support plate, so that the tilting position of the tilting support plate is held. When the flat panel display is manually rotated in the horizontal direction in the horizontal plane, the operative gear fixed to the rotating plate rotates in the horizontal plane and the rotation is transmitted to the plurality of friction discs through the small gear meshing with the operative gear through the rotating plate, so that the rotational position of the rotating plate is held. Thus, the flat panel display is tiltable in the anteroposterior direction and rotatable in the horizontal direction, and is so formed that the anteroposterior tilting state and the horizontal rotational state of the flat panel display are held.

A hinge apparatus (display screen turning apparatus) of a flat panel display disclosed in the aforementioned Japanese Patent Laying Open No. 2007-293245 comprises an anteroposterior tilting mechanism including a tilting support plate (display screen support member) supporting a flat panel display (display screen portion), a driving portion formed by an electric motor, a screw provided below the tilting support plate at a position separated from a center of the tilting support plate and moving upward and downward by driving force from the driving portion, and an elevating member provided on an upper portion of the screw and supporting the tilting support plate from below. The hinge apparatus of the flat panel display further comprises a horizontal rotational mechanism including a driving portion formed by an electric motor, a rotating plate provided with an anteroposterior tilting mechanism on an upper surface, a gear fixed below the rotating plate and rotating the rotating plate in the horizontal direction by driving force from the driving portion. In this hinge apparatus of the flat panel display described in Japanese Patent Laying Open No. 2007-293245, the tilting support plate is tilted in the anteroposterior direction through the elevating member by moving the screw upward and downward by the electric motor, and the rotating plate is rotated in the horizontal direction by rotating the gear in the horizontal direction by the electric motor.

The aforementioned Japanese Patent Laying Open No. 2007-295476 discloses a rotating apparatus comprising a driving portion, a disc member having a protrusion and transmitting driving force, and a ring member having a groove portion receiving the protrusion and transmitting driving force to the disc member. This rotating apparatus described in Japanese Patent Laying Open No. 2007-295476 is so formed that the disc member can be rotated in the horizontal plane by the driving force from the driving portion and the disc member can be rotated in the horizontal plane by slipping the protrusion in the groove portion when force is manually applied. This Japanese Patent Laying Open No. 2007-295476 does not disclose a mechanism for rotating the rotating apparatus in the anteroposterior direction by a prescribed angle with respect to the vertical plane.

In the hinge apparatus of the flat panel display described in the aforementioned Japanese Patent Laying Open No. 2007-334112, however, since the weight of the flat panel display is applied to the coupling members and hence a load is disadvantageously applied to a fixing portion of the coupling members and the horizontal pivot or the tilting support plate. Thus, it is conceivable that the coupling members for rotating the tilting support plate in the anteroposterior direction by the prescribed angle with respect to the vertical plane is disadvantageously easily to be damaged.

In the aforementioned hinge apparatus of the flat panel display described in Japanese Patent Laying Open No. 2007-293245, it is necessary to apply pressing force from below to the tilting support plate by moving the screw and the elevating member vertically upward to rotate the tilting support plate in the anteroposterior direction, and hence the weight of the flat panel display, acting vertically downward disadvantageously has a great impact. Thus, large force is disadvantageously required in order to rotate the tilting support plate in the anteroposterior direction by the prescribed angle with respect to the vertical plane. When the screw and the elevating member move in the vertical direction, the weight of the flat panel display, acting vertically downward is disadvantageously substantially concentrated on the screw and the elevating member. Thus, it is conceivable that the screw and the elevating member for rotating the tilting support plate in the anteroposterior direction by the prescribed angle with respect to the vertical plane is disadvantageously easily to be damaged.

The rotating apparatus described in the aforementioned Japanese Patent Laying Open No. 2007-295476 is so formed that the disc member can be rotated in the horizontal plane, and hence the display screen portion and the like provided on the upper portion of the rotating apparatus can not be disadvantageously rotated in the anteroposterior direction by the prescribed angle with respect to the vertical plane.

SUMMARY OF THE INVENTION

The present invention has been proposed in order to solve the aforementioned problems, and an object of the present invention is to provide a display screen turning apparatus in which breakage of a component for rotating a display screen support member in an anteroposterior direction by a prescribed angle with respect to a vertical plane can be suppressed and the display screen support member can be rotated in the anteroposterior direction by the prescribed angle with respect to the vertical plane without large force.

A display screen turning apparatus according to a first aspect of the present invention comprises a display screen support member provided with a first gear and supporting a display screen portion rotatably in a horizontal plane and rotatably with respect to a vertical plane and a rack plate provided with a second gear meshing with the first gear, wherein the first gear meshed with the second gear moves by movement of the second gear following linear movement of the rack plate in the horizontal plane, thereby rotating the display screen support member in an anteroposterior direction by a prescribed angle with respect to the vertical plane.

In this display screen turning apparatus according to the first aspect, as hereinabove described, the first gear meshed with the second gear moves by movement of the second gear following linear movement of the rack plate in the horizontal plane, so that the display screen support member is rotated in the anteroposterior direction by the prescribed angle with respect to the vertical plane, whereby the influence of the weight, acting vertically downward, of the display screen portion can be reduced by rotating the display screen support member in the anteroposterior direction by linear movement of the rack plate in the horizontal plane, as compared with a case where the display screen support member is rotated in the anteroposterior direction by moving the rack plate vertically upward to apply pressing force from below to the display screen support member, and hence the display screen support member can be rotated in the anteroposterior direction by the prescribed angle with respect to the vertical plane without large force. Further, force disperses to a plurality of teeth of the gear by employing a gear member, and hence it is possible to suppress breakage of a component for rotating the display screen support member in the anteroposterior direction by the prescribed angle with respect to the vertical plane, as compared with a case where a screw member so formed that the weight, acting vertically downward, of the display screen portion substantially concentrates on a point and so provided as to move vertically, or a coupling member so formed that a load by the weight of a flat panel display is applied to a fixed portion is employed.

In the aforementioned display screen turning apparatus according to the first aspect, the second gear is preferably provided rotatably with respect to the rack plate in the horizontal plane. According to this structure, the first gear and the second gear can mesh with each other even when the display screen support member rotates by the prescribed angle in the horizontal plane, and hence the display screen support member can be rotated in the anteroposterior direction by the prescribed angle with respect to the vertical plane.

In this case, the first gear is preferably fixed so as not to rotate with respect to the display screen support member, and the second gear is preferably formed to rotate in the horizontal plane through the first gear following rotation of the display screen support member in the horizontal plane. According to this structure, no member is not required for rotating the second gear and hence increase in the number of components can be suppressed.

In the aforementioned display screen turning apparatus in which the second gear rotates following the rotation of the display screen support member in the horizontal plane, the first gear meshed with the second gear is preferably rendered movable in a meshing direction of the first gear and the second gear and slidable with respect to the second gear in a direction perpendicular to the meshing direction following movement of the second gear, in a case where the second gear moves following linear movement of the rack plate in the horizontal plane while a movement direction of the rack plate and the meshing direction of the first gear and the second gear are different from each other by rotating the first gear and the second gear following rotation of the display screen support member in the horizontal plane. According to this structure, the meshing of the first gear and the second gear is maintained by slide of the first gear with respect to the second gear in the direction perpendicular to the meshing direction of the first gear when the rack plate moves, also when the movement direction of the rack plate and the meshing direction of the first gear and the second gear are different from each other. Thus, the display screen support member can be rotated in the anteroposterior direction by the prescribed angle with respect to the vertical plane by linear movement of the rack plate, also when the movement direction of the rack plate and the meshing direction of the first gear and the second gear are different from each other.

In the aforementioned display screen turning apparatus according to the first aspect, a tooth flank of the first gear is preferably formed to have an arcuate shape convexed toward the second gear as viewed from a side portion, and the second gear is a rack gear having a plurality of flatly formed tooth tips. According to this structure, the tooth flank of the second gear linearly moves in the horizontal plane due to linear movement of the rack plate provided with the second gear in the horizontal plane. Thus, the first gear meshed with the second gear and having the arcuate tooth flank convexed toward the second gear moves to rotate following linear movement of the rack gear, and hence the display screen support member provided with the first gear can be rotated in the anteroposterior direction by the prescribed angle with respect to the vertical plane.

In the aforementioned display screen turning apparatus according to the first aspect, the first gear and the second gear are preferably formed to be located on a rotation center in rotation of the display screen support member in the horizontal plane. According to this structure, the meshing state of the first gear and the second gear can be reliably maintained also in a state where the display screen support member rotates in the horizontal plane.

In the aforementioned display screen turning apparatus according to the first aspect, the first gear and the second gear are preferably so formed that at least two teeth and corresponding at least two teeth mesh with each other when the display screen support member rotates in the anteroposterior direction by the prescribed angle with respect to the vertical plane. According to this structure, force can disperse to the teeth of the first gear and the teeth of the second gear as compared with a case where a single tooth meshes with a corresponding single tooth. Thus, the display screen support member can be further stably rotated in the anteroposterior direction by the prescribed angle with respect to the vertical plane.

In the aforementioned display screen turning apparatus in which the first gear is movable in the meshing direction and slidable in the direction perpendicular to the meshing direction, the first gear is preferably rendered slidable with respect to the second gear in the direction perpendicular to the meshing direction while meshing of the first gear and the second gear is not released when the display screen support member rotates in the anteroposterior direction by the prescribed angle with respect to the vertical plane in a rotational range of the display screen support member in the horizontal plane. According to this structure, the first gear can slide with respect to the second gear in the direction perpendicular to the meshing direction even when the display screen support member rotates in the horizontal plane, and hence the meshing of the first gear and the second gear can be maintained. Thus, the display screen support member can be further reliably rotated in the anteroposterior direction by the prescribed angle with respect to the vertical plane.

In this case, the first gear is preferably rendered slidable with respect to the second gear in the direction perpendicular to the meshing direction while the first gear and the second gear overlap with each other in plan view when the display screen support member rotates in the anteroposterior direction by the prescribed angle with respect to the vertical plane in the rotational range of the display screen support member in the horizontal plane. According to this structure, meshing of the first gear and the second gear is maintained by overlap of the first gear and the second gear even when the display screen support member rotates in the horizontal plane, and hence the display screen support member can be rotated in the anteroposterior direction by the prescribed angle with respect to the vertical plane.

In the aforementioned display screen turning apparatus in which the first gear and the second gear overlap with each other, the first gear and the second gear are preferably formed to mesh with each other in the rotational range of the display screen support member in the horizontal plane and in a rotational range in which the display screen support member rotates in the anteroposterior direction by the prescribed angle with respect to the vertical plane. According to this structure, the display screen support member can be further reliably rotated in the anteroposterior direction by the prescribed angle with respect to the vertical plane in the rotational range of the display screen support member in the horizontal plane and in the rotational range in which the display screen support member rotates in the anteroposterior direction by the prescribed angle with respect to the vertical plane.

The aforementioned display screen turning apparatus according to the first aspect preferably further comprises a horizontal rotating plate rotating the display screen support member in the horizontal plane, wherein the rack plate is preferably arranged on a position between the display screen support member and the horizontal rotating plate while not fixed to the horizontal rotating plate. According to this structure, the second gear provided on the rack plate and the first gear provided on the display screen support member can be easily meshed with each other. Further, the rack plate is not fixed to the horizontal rotating plate, so that linear movement of the rack plate can be always the same direction. Thus, the rack plate can reliably linearly moves.

In the aforementioned display screen turning apparatus in which the second gear is rotatable with respect to the rack plate in the horizontal plane, the second gear preferably has a cylindrical protrusion formed on a surface opposite to a tooth flank of the second gear, and the rack plate preferably includes a circular hole receiving the protrusion while the second gear is rotatable with respect to the rack plate in the horizontal plane. According to this structure, the second gear can be easily rendered rotatable with respect to the rack plate in the horizontal plane by inserting the cylindrical protrusion into the circular hole.

In this case, the surface opposite to the tooth flank of the second gear except the protrusion is preferably flatly formed to come into surface contact with the rack plate, and a surface of the rack plate corresponding to the surface opposite to the tooth flank of the second gear is preferably flatly formed. According to this structure, the second gear and the rack plate come into surface contact with each other in a planar surface, and hence the second gear can be further stably rotated in the horizontal plane with respect to the rack plate.

In the aforementioned display screen turning apparatus in which the tooth flank of the first gear is formed to have the arcuate shape, the first gear preferably has a first planar surface portion formed on a surface opposite to the tooth flank having the arcuate shape, and the display screen support member is preferably formed on a surface corresponding to the surface opposite to the tooth flank of the first gear and includes a second planar surface portion formed to correspond to the first planar surface portion. According to this structure, the first planar surface portion of the first gear and the second planar surface portion of the display screen support member come into surface contact with each other, and hence the first gear and the display screen support member can be further stably fixed.

In the aforementioned display screen turning apparatus in which the second gear rotate in the horizontal plane through the first gear, the first gear and the second gear are preferably rectangular in plan view, and a central portion of the first gear and a central portion of the second gear preferably substantially coincide with each other while not rotating in the anteroposterior direction by the prescribed angle with respect to the vertical plane of the display screen support member. According to this structure, the meshing width of the first gear and the second gear can be increased, and hence the display screen support member can be further stably rotated in the anteroposterior direction by the prescribed angle with respect to the vertical plane.

A television set according to a second aspect of the present invention comprises a display screen portion displaying a television image, a display screen support member provided with a first gear and supporting the display screen portion rotatably in a horizontal plane and rotatably with respect to a vertical plane, and a rack plate provided with a second gear meshing with the first gear, wherein the first gear meshed with the second gear moves by movement of the second gear following linear movement of the rack plate in the horizontal plane, thereby rotating the display screen support member in an anteroposterior direction by a prescribed angle with respect to the vertical plane.

In this television set according to the second aspect of the present invention, as hereinabove described, the first gear meshed with the second gear moves by movement of the second gear following linear movement of the rack plate in the horizontal plane, so that the display screen support member is rotated in the anteroposterior direction by the prescribed angle with respect to the vertical plane, whereby the influence of the weight, acting vertically downward, of the display screen portion can be reduced by rotating the display screen support member in the anteroposterior direction by linear movement of the rack plate in the horizontal plane, as compared with a case where the display screen support member is rotated in the anteroposterior direction by moving the rack plate vertically upward to apply pressing force from below to the display screen support member, and hence the display screen support member can be rotated in the anteroposterior direction by the prescribed angle with respect to the vertical plane without large force. Further, force disperses to a plurality of teeth of the gear by employing a gear member, and hence it is possible to suppress breakage of a component for rotating the display screen support member in the anteroposterior direction by the prescribed angle with respect to the vertical plane, as compared with a case where a screw member so formed that the weight, acting vertically downward, of the display screen portion substantially concentrates on a point and so provided as to move vertically, or a coupling member so formed that a load by the weight of the flat panel display is applied to a fixed portion is employed.

In the aforementioned television set according to the second aspect, the second gear is preferably provided rotatably with respect to the rack plate in the horizontal plane. According to this structure, the first gear and the second gear can mesh with each other even when the display screen support member rotates by the prescribed angle in the horizontal plane, and hence the display screen support member can be rotated in the anteroposterior direction by the prescribed angle with respect to the vertical plane.

In this case, the first gear is preferably fixed so as not to rotate with respect to the display screen support member, and the second gear is preferably formed to rotate in the horizontal plane through the first gear following rotation of the display screen support member in the horizontal plane. According to this structure, no member is not required for rotating the second gear and hence increase in the number of components can be suppressed.

In the aforementioned television set in which the second gear rotates following rotation of the display screen support member in the horizontal plane, the first gear meshed with the second gear is preferably rendered movable in a meshing direction of the first gear and the second gear and slidable with respect to the second gear in a direction perpendicular to the meshing direction following movement of the second gear, in a case where the second gear moves following linear movement of the rack plate in the horizontal plane while a movement direction of the rack plate and the meshing direction of the first gear and the second gear are different from each other by rotating the first gear and the second gear following rotation of the display screen support member in the horizontal plane. According to this structure, the meshing of the first gear and the second gear is maintained by slide of the first gear with respect to the second gear in the direction perpendicular to the meshing direction of the first gear when the rack plate moves, also when the movement direction of the rack plate and the meshing direction of the first gear and the second gear are different from each other. Thus, the display screen support member can be rotated in the anteroposterior direction by the prescribed angle with respect to the vertical plane by linear movement of the rack plate, also when the movement direction of the rack plate and the meshing direction of the first gear and the second gear are different from each other.

In the aforementioned television set according to the second aspect, a tooth flank of the first gear is preferably formed to have an arcuate shape convexed toward the second gear as viewed from a side portion, and the second gear is preferably a rack gear having a plurality of flatly formed tooth tips. According to this structure, the tooth flank of the second gear linearly moves in the horizontal plane due to linear movement of the rack plate provided with the second gear in the horizontal plane. Thus, the first gear meshed with the second gear and having the arcuate tooth flank convexed toward the second gear moves to rotate following linear movement of the second gear, and hence the display screen support member provided with the first gear can be rotated in the anteroposterior direction by the prescribed angle with respect to the vertical plane.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

A structure of a display screen turning apparatus 20 according to the embodiment of the present invention will be now described with reference to FIGS. 1 to 8. This embodiment of the present invention is applied to the display screen turning apparatus 20 supporting a liquid crystal television 100 employed as an exemplary television set.

Figure 1:
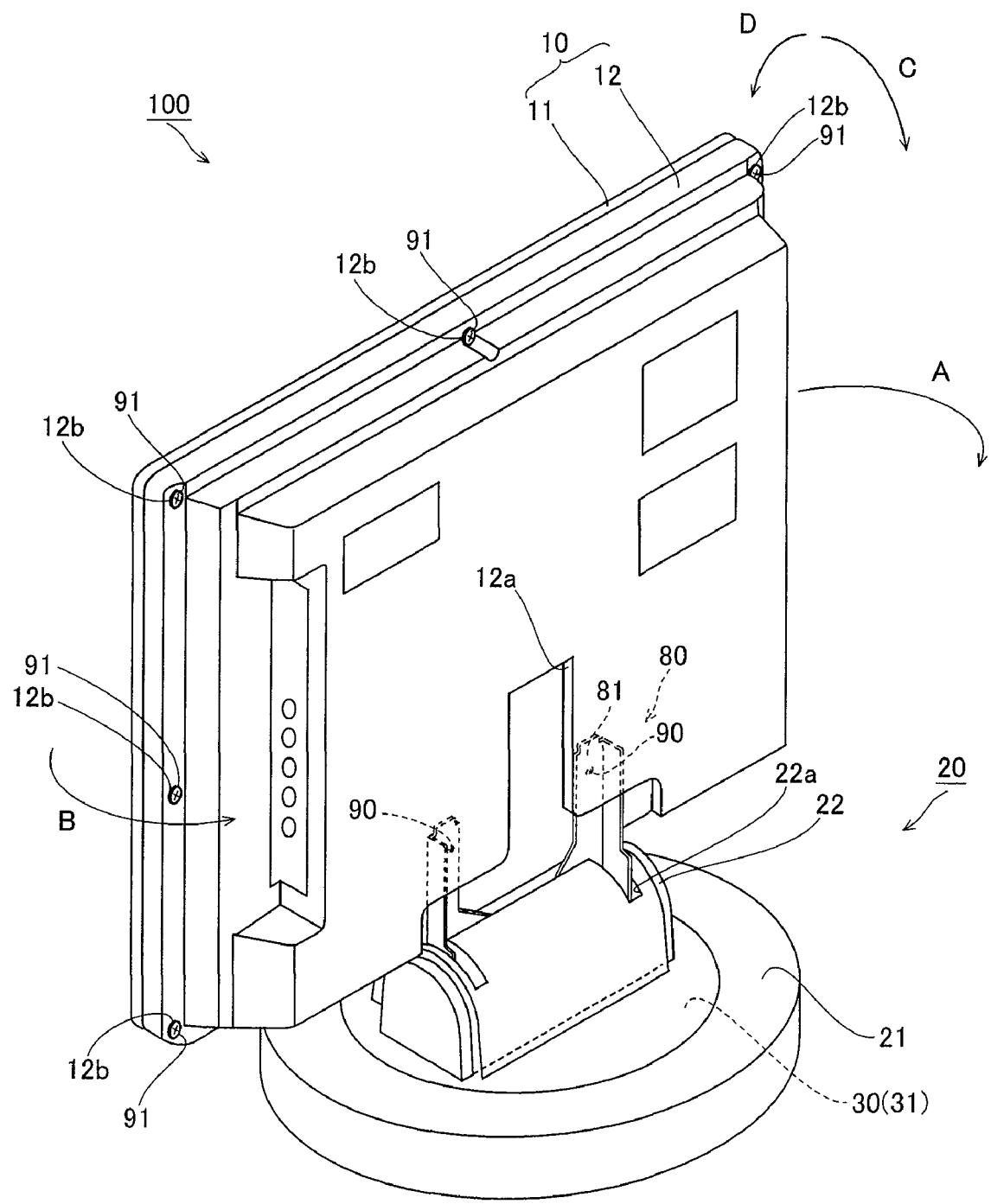
FIG. 1 is a perspective view showing an overall structure of a liquid crystal television provided with a display screen turning apparatus according to an embodiment of the present invention.

The display screen turning apparatus 20 according to the embodiment of the present invention is so provided as to render a display body 10, supported by a display screen support mechanism 80, of the liquid crystal television 100 horizontally turnable (along arrows A and B) by a prescribed angle in a horizontal plane and anteroposteriorly inclinable (along arrows C and D) by a prescribed angle with respect to a vertical plane, as shown in FIG. 1. The display body 10 is an example of the "display screen portion" in the present invention.

Figure 2:
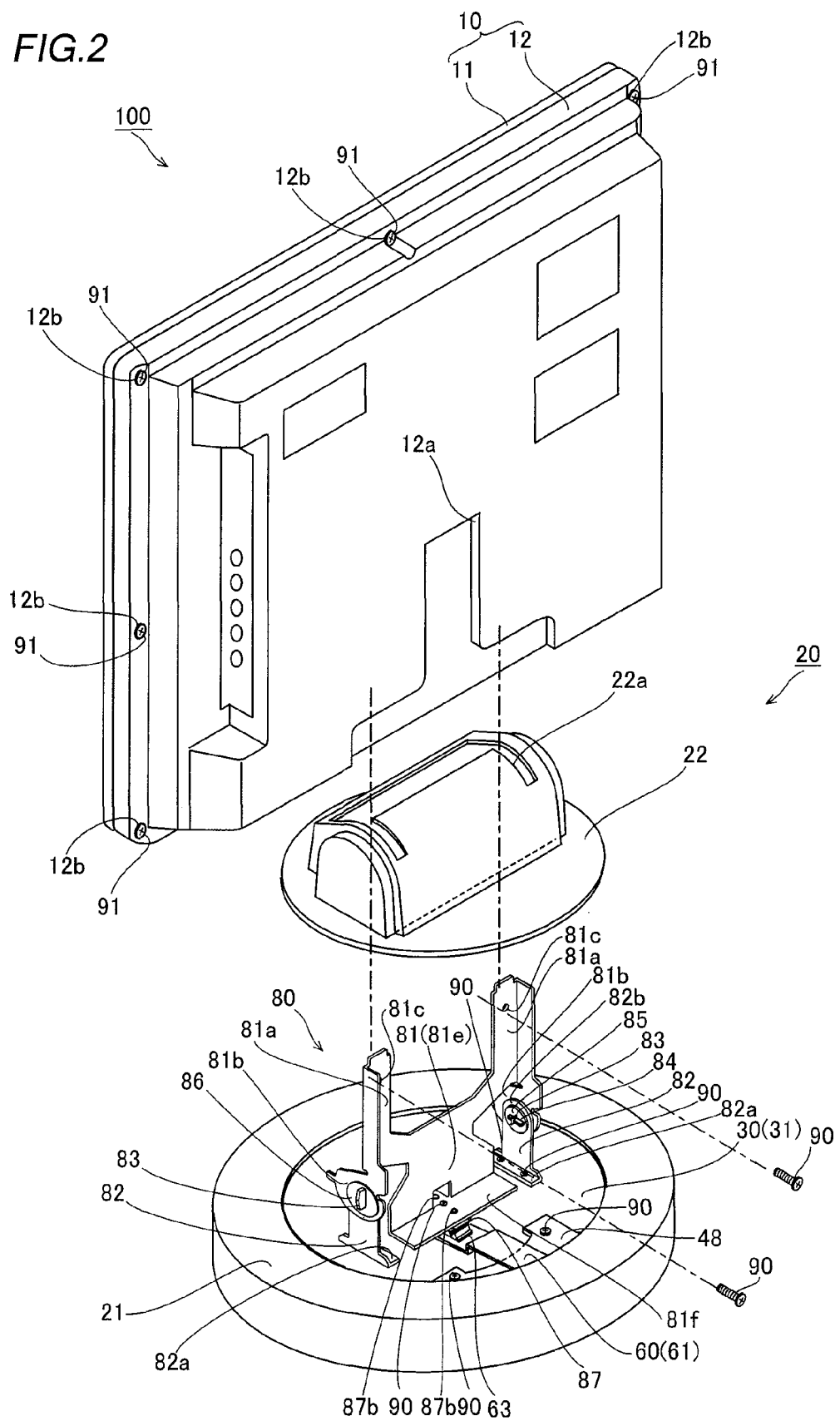
FIG. 2 is an exploded perspective view of the liquid crystal television provided with the display screen turning apparatus according to the embodiment of the present invention shown in FIG. 1.
Figure 3:
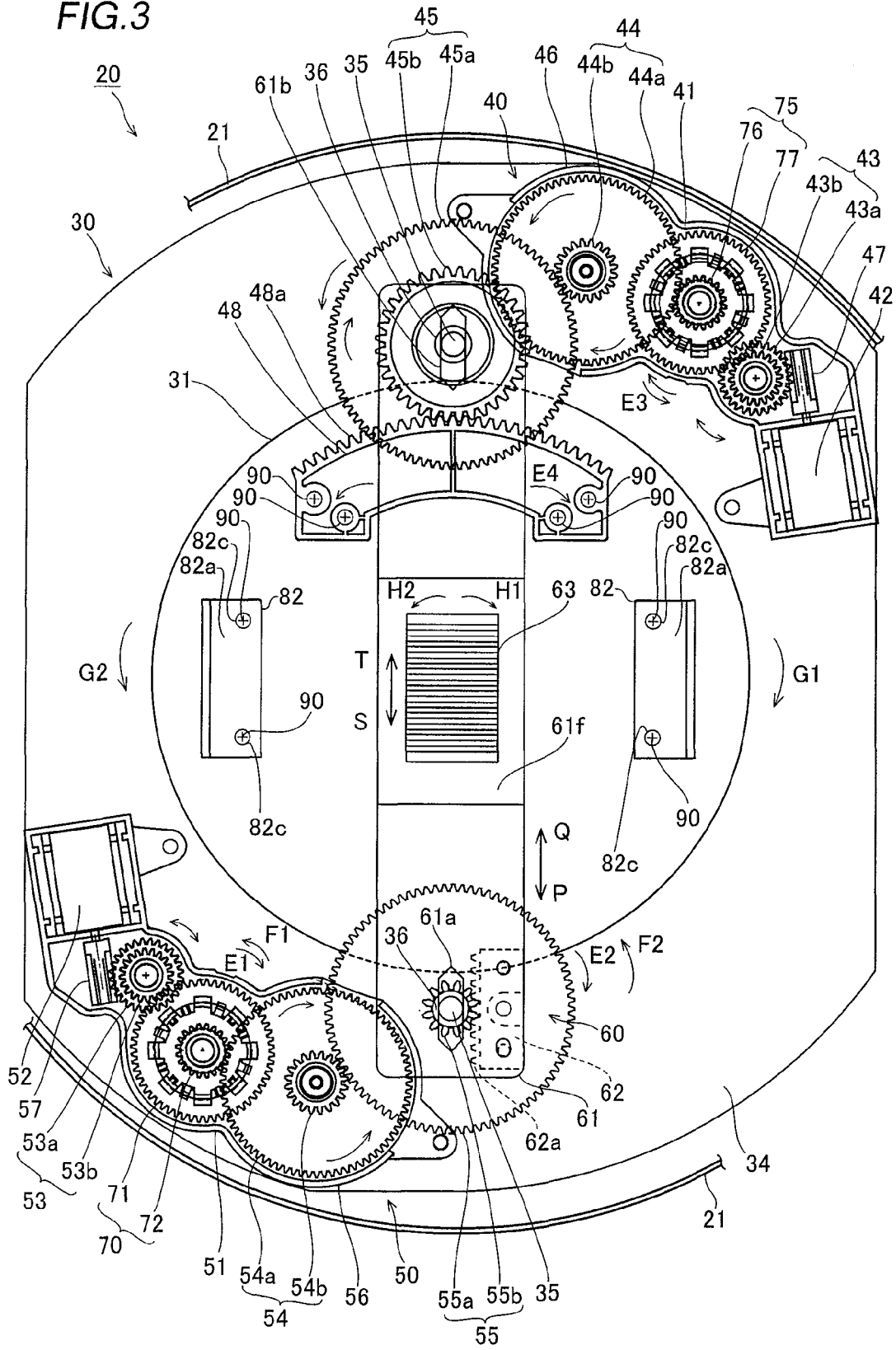
FIG. 3 is a plan view for illustrating a structure of the display screen turning apparatus according to the embodiment of the present invention shown in FIG. 1.

As shown in FIG. 3, the display screen turning apparatus 20 is constituted by a base portion 30 for horizontally turning the display body 10 (see FIG. 2) supported by the display screen support mechanism 80 (see FIG. 2) in the horizontal plane (along arrows A and B in FIG. 1), a horizontal turning/driving portion 40 horizontally turning a turntable 31, described later, arranged on the base portion 30 while controlling the turning angle of the turntable 31, and a vertical turning/driving portion 50 anteroposteriorly turning the display body 10 supported by the display screen support mechanism 80 by a prescribed angle with respect to a vertical plane (along arrows C and D in FIG. 1) while controlling the turning angle of the display screen support mechanism 80.

Figure 4:
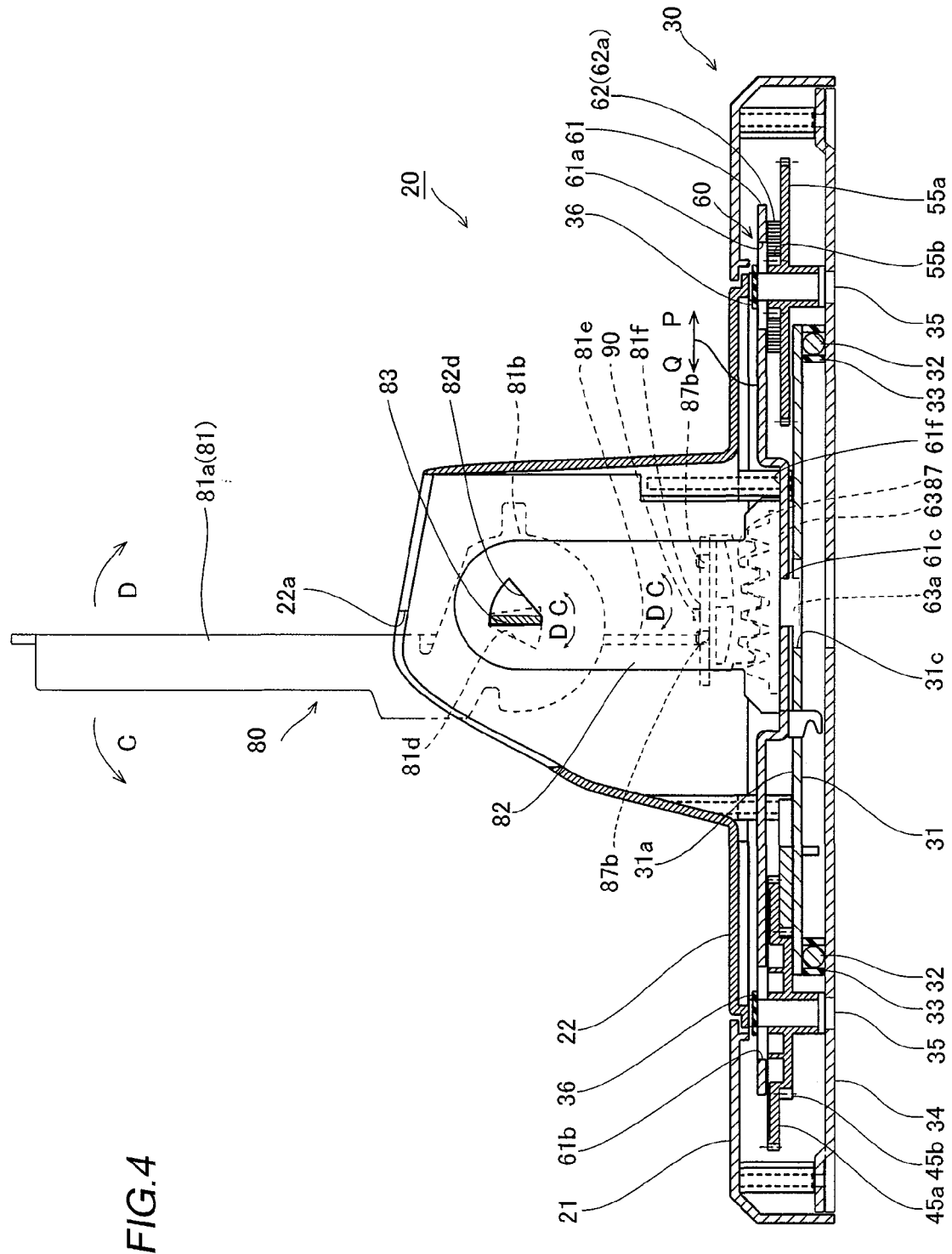
FIG. 4 is a sectional view for illustrating the structure of the display screen turning apparatus according to the embodiment of the present invention shown in FIG. 1.
Figure 5:
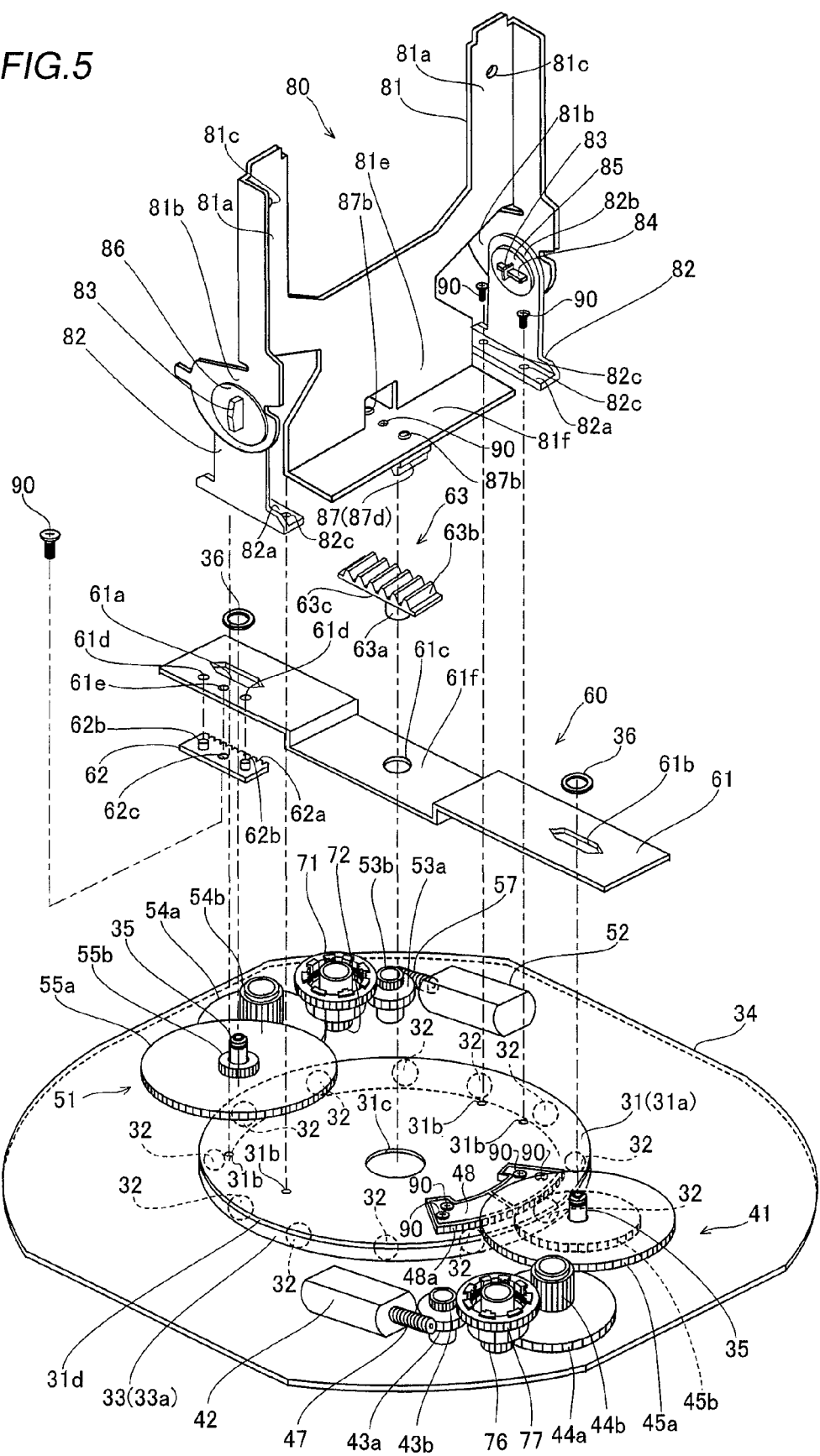
FIG. 5 is an exploded perspective view for illustrating the detailed structure of the display screen turning apparatus according to the embodiment of the present invention shown in FIG. 1.

As shown in FIGS. 3 to 5, the base portion 30 includes the turntable 31 of sheet metal mounted with the display screen support mechanism 80 (see FIG. 5), a guide member 33 (see FIG. 5) of resin having a plurality of steel balls 32 (see FIG. 5) arranged therein at prescribed intervals and rotatably holding the steel balls 32 (see FIG. 5), a base member 34 of sheet metal, a support member (not shown) of metal rotatably supporting the turntable 31 on the base member 34, boss members 35 of resin receiving rotating shafts of gears 45 and 55 described later to be rotatable while receiving a rack plate 60 of the vertical turning/driving portion 50 to be reciprocative in the horizontal plane, and stop ring members 36 of the rack plate 60 received by the boss members 35. In other words, the rack plate 60 is so mounted not on the turntable 31 but on the boss members 35 as to be supported on the base portion 30 in a reciprocative manner in the horizontal plane. The rack plate 60 is arranged above the turntable 31 and below a display screen support member 81, described later, of the display screen support mechanism 80, so that the rack plate is arranged on a position between the turntable 31 and the display screen support member 81.

Figure 6:
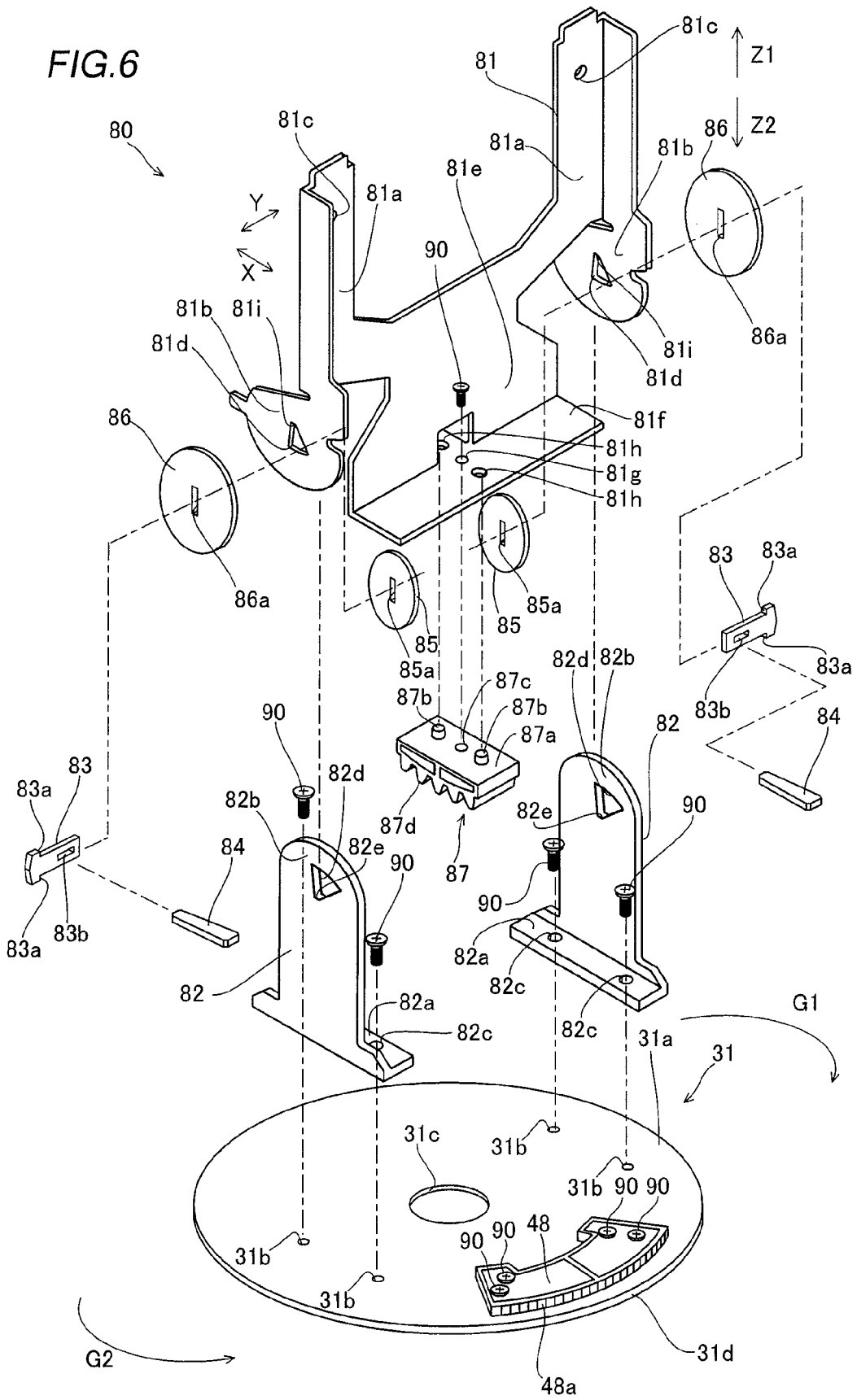
FIG. 6 is an exploded perspective view for illustrating the detailed structures of a display screen support mechanism and a turntable according to the embodiment of the present invention.

As shown in FIGS. 5 and 6, the turntable 31 of the base portion 30 includes four screw mounting holes 31b provided on an upper surface 31a and a hole 31c provided at the center of the upper surface 31a (in the vicinity of the rotation center of the turntable 31). As shown in FIG. 3, the turntable 31 is arranged on a substantially central portion of the base member 34, to be rotatable in the horizontal plane. A plurality of support members (not shown) provided on the base member 34 to circularly enclose the turntable 31 come into surface contact with outer peripheral surfaces 31d and 33a (see FIG. 5) of the turntable 31 and the guide member 33 (see FIG. 5), thereby holding the turntable 31 to be rotatable in the horizontal plane. The turntable 31 is an example of the "horizontal rotating plate" in the present invention.

As shown in FIGS. 3 and 5, the vertical turning/driving portion 50 is constituted by a transmission gear portion 51 consisting by a plurality of gear members, a stepping motor 52 serving as a driving source for the transmission gear portion 51 and the rack plate 60 for rotating the display screen support member 81, described later, rotatably provided on the display screen support mechanism 80 mounted on the turntable 31 of the base portion 30 in the anteroposterior direction (along arrows C and D in FIG. 1) with respect to the vertical plane.

As shown in FIG. 5, the rack plate 60 is constituted by a plate member 61 made of sheet metal and the rack gears 62 and 63 made of resin. The rack gear 63 is an example of the "second gear" in the present invention. The rack plate 60 is so arranged that the substantially overall upper and lower surfaces of the rack plate 60 are horizontalized. The rack gear 62 is mounted on the lower surface of the plate member 61 with a screw 90, as shown in FIG. 5. The rack gear 62 is so formed as to horizontally mesh with a small-diametral gear portion 55 of a gear 55 described later, as shown in FIG. 3

As shown in FIG. 5, slots 61a and 61b extending along a longitudinal direction of the plate member 61 are formed in the vicinity of both longitudinal end portions of the plate member 61 respectively, while a circular receiving hole 61c receiving a protrusion 63a of the rack gear 63 is formed on a substantially central portion of the plate member 61. The plate member 61 further has two positioning holes 61d and a screw mounting hole 61e. A central region 61f of the plate member 61 is formed to come into surface contact with a rear surface 63c, described later, of the rack gear 63 and planalized. The receiving hole 61c is an example of the "hole" in the present invention.

The rack gear 62 has a gear portion 62a formed along a first longitudinal side surface, and is formed with two bosses 62b and a screw receiving hole 62c, as shown in FIG. 5. Therefore, the bosses 62b of the rack gear 62 are fitted into the positioning holes 61d of the plate member 61 while the screw 90 is clamped into the screw mounting hole 61e of the plate member 61 through the screw receiving hole 62c of the rack gear 62 so that the rack gear 62 can be mounted on the plate member 61 from below, as shown in FIG. 5.

According to this embodiment, the rack gear 63 is rectangular in plan view, as shown in FIG. 5. The rear surface 63c of the rack gear 63 arranged on the plate member 61 is flatly formed and a tooth flank 63b having a plurality of tooth tips is flatly formed on the overall surface which is an opposite side of the rear surface 63c to extend in a short-side direction of the rectangle. The cylindrical protrusion 63a (see FIG. 8) insertable into the receiving hole 61c of the plate member 61 is formed on a substantially central portion of the rear surface 63c of the rack gear 63. Thus, when the protrusion 63a is inserted into the receiving hole 61c of the plate member 61, the tooth flank 63b is horizontalized (planarized), and rotatable along arrow H1 or H2 (see FIG. 3) with respect to the plate member 61. The protrusion 63a is an example of the "protrusion" in the present invention.

According to this embodiment, when the pair of boss members 35 provided on the base member 34 are inserted into the rack plate 60 through the slots 61a and 61b of the plate member 61 respectively, the rack plate 60 is linearly reciprocative along arrows P and Q, as shown in FIGS. 3 and 4. Therefore, normal or reverse rotation of the stepping motor 52 is so transmitted to the rack gear 62 through the transmission gear portion 51 that the rack plate 60 is linearly reciprocative on the turntable 31 along arrows P and Q.

The display screen support mechanism 80 is fixed by four screws 90 inserted into the screw mounting holes 31b of the turntable 31 of the base portion 30, as shown in FIG. 5. Thus, when the turntable 31 of the base portion 30 is rotated on a horizontal plane, the display screen support mechanism 80 is rendered rotatable in the horizontal plane and supportable while inclining the display body 10 by a prescribed angle in the anteroposterior direction (along arrows C and D) with respect to the vertical plane of the display screen turning apparatus 20.

The display screen support mechanism 80 is constituted by the display screen support member 81 made of sheet metal, a pair of vertical support members 82 made of sheet metal and plate-shaped support shafts 83 made of sheet metal, stop members 84 made of sheet metal, pressure plates 85 and 86 made of sheet metal, and a rotating gear 87 made of resin so arranged as to mesh with the rack gear 63 of the rack plate 60, as shown in FIG. 6. The rotating gear 87 is an example of the "first gear" in the present invention. The display screen support member 81 is mounted on the pair of vertical support members 82 to be rotatable with torque exceeding a prescribed level.

Figure 7:
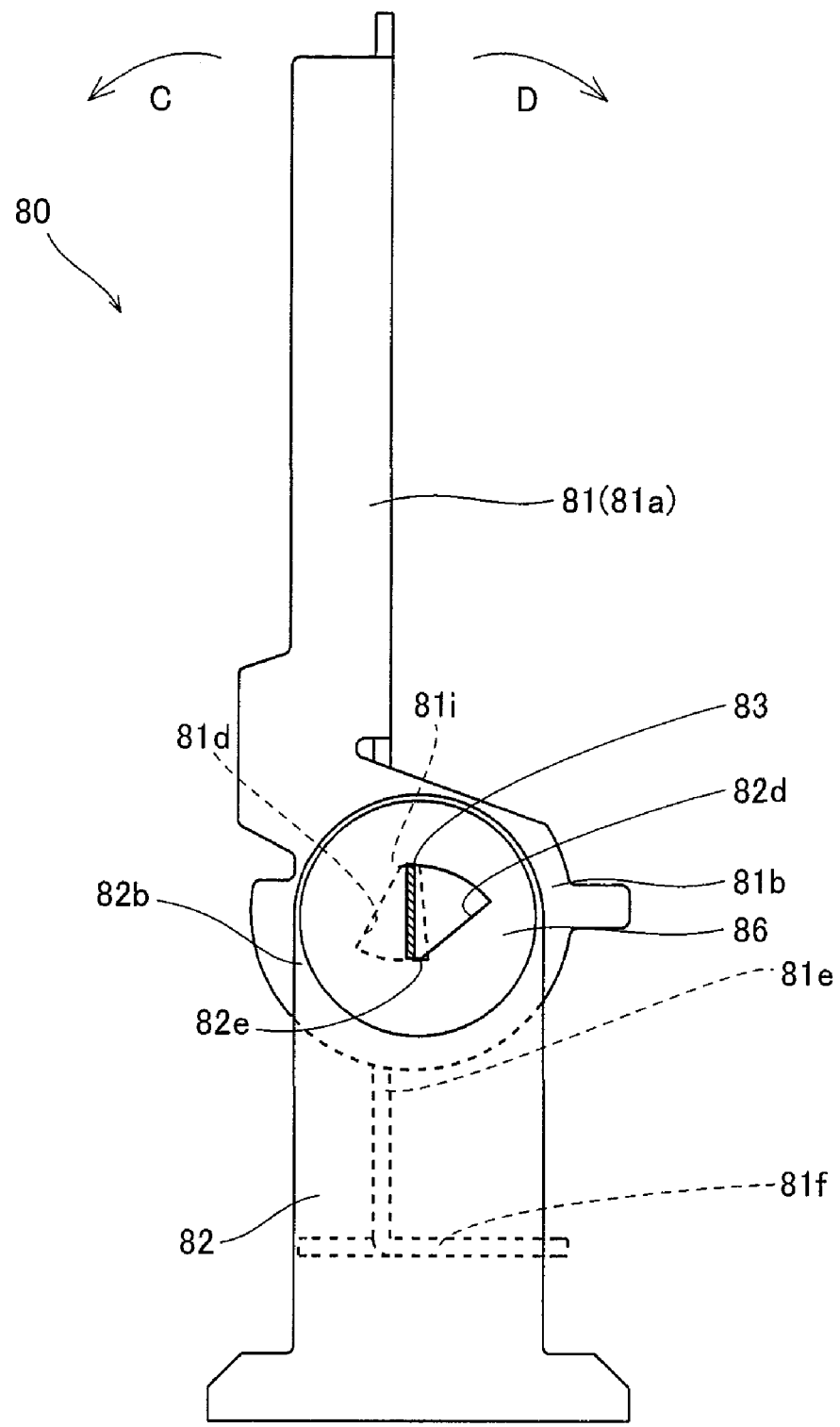
FIG. 7 is a diagram showing combination of the display screen support member and vertical support members by support shafts according to the embodiment of the present invention.

The display screen support member 81 integrally includes a pair of display body mounting portions 81a so provided as to extend upward (along arrow Z1) and a pair of rotating portions 81b provided on both side surfaces of the display screen support member 81 in a direction Y respectively, as shown in FIG. 6. Screw receiving holes 81c are formed in the pair of display body mounting portions 81a of the display screen support member 81 respectively. The pair of rotating portions 81b of the display screen support member 81 are provided to extend from both end portions of the display body mounting portions 81a in the vertical direction (direction X) with respect to the surface of the display body mounting portions 81a respectively. As shown in FIGS. 6 and 7, sectorial holes 81d are formed in the vicinity of rotation centers of the pair of rotating portions 81b respectively. As shown in FIG. 6, a body portion 81e so provided as to extend downward (along arrow Z2) from the display body mounting portions 81a is integrally formed on the display screen support member 81.

A lower surface portion 81f protruding in a direction (direction X) perpendicular to the body portion 81e is formed on the lower end of the body portion 81e as shown in FIG. 6. This lower surface portion 81f is integrally provided with the body portion 81e. A screw receiving hole 81g receiving a screw 90 for fixing the rotating gear 87 and the display screen support member 81 to each other is formed at the central portion of the lower surface portion 81f. A pair of boss receiving holes 81h are formed in the direction X to hold the screw receiving hole 81g therebetween. A pair of bosses 87b, described later, of the rotating gear 87 are inserted into the pair of boss receiving holes 81h respectively.

According to this embodiment, the rotating gear 87 is rectangular in plan view, as shown in FIG. 6. The rotating gear 87 is so arranged as to mesh with the rack gear 63 of the rack plate 60 from above as shown in FIG. 4, and arranged on a substantially central portion of the lower surface portion 81f of the display screen support member 81 as shown in FIG. 5. Further, the rack gear 63 and the rotating gear 87 are positioned on the horizontal rotation centers (along arrows G1 and G2 in FIG. 6) of the turntable 31 and the display screen support member 81, and the central portion of the rack gear 63 and the central portion of the rotating gear 87 are substantially coincide with each other. The pair of bosses 87b inserted into the pair of boss receiving holes 81h of the display screen support member 81 are formed on an upper surface 87a of the rotating gear 87. A screw hole 87c is formed on a central portion between the pair of bosses 87b. This screw hole 87c is so formed as to correspond to the screw receiving hole 81g of the display screen support member 81. The upper surface 87a of the rotating gear 87 is flatly formed except portions where the pair of bosses 87b and the screw hole 87c are formed. The upper surface 87a is an example of the "first planar surface portion" in the present invention.

Figure 8:
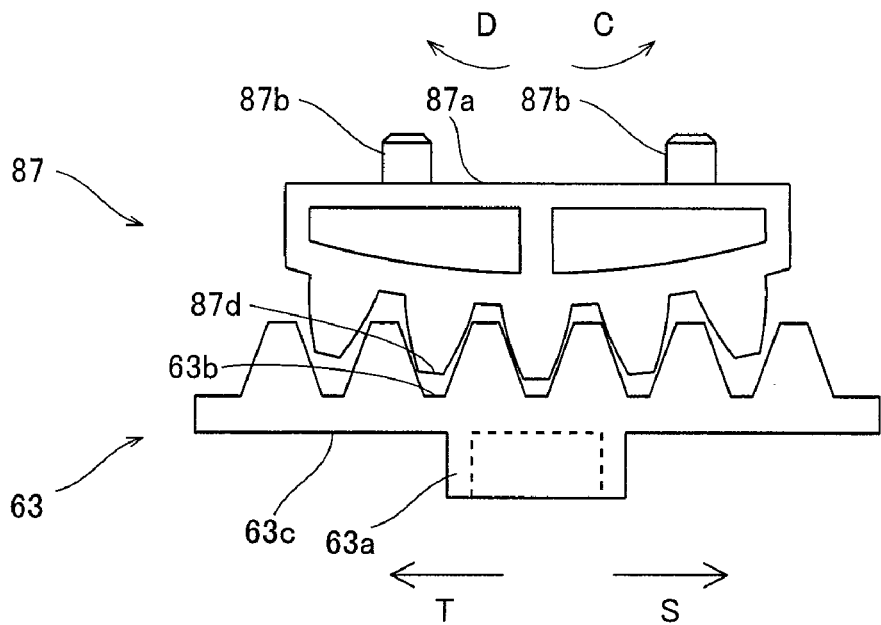
FIG. 8 is a diagram showing a meshing state of a rack gear and a rotating gear according to the embodiment of the present invention.

According to this embodiment, teeth of the rotating gear 87 is so formed on an overall lower surface 87d of the rotating gear 87 in the short-side direction of the rectangle, as shown in FIGS. 6 and 8. A tooth flank of the rotating gear 87 is formed, to have an arcuate shape convexed toward the rack gear 63 arranged downward (along arrow Z2 in FIG. 6) as viewed from a side portion. Thus, the rack gear 63 and the rotating gear 87 are slidable in the horizontal plane in a direction perpendicular to a meshing direction, along arrows S and T (see FIG. 8), of the rack gear 63 and the rotating gear 87.

The rack gear 63 and the rotating gear 87 are so formed that the longitudinal directions of the rectangles and the meshing direction thereof coincide with each other respectively. In other words, the longitudinal directions of the rectangles and the meshing directions are the same direction, namely directions along arrow S and along arrow T (see FIG. 8). Thus, the rack gear 63 and the rotating gear 87 are formed to overlap with each other in plan view.

As shown in FIG. 5, the upper surface 87a of the rotating gear 87 is fixed to the flatly formed lower surface portion 81f of the display screen support member 81 with the screw 90. Thus, the rotating gear 87 is fixed to the display screen support member 81, so that the rotation of the display screen support member 81 in the horizontal plane is transmitted to the rack gear 63 meshing with the rotating gear 87 through the rotating gear 87. The lower surface portion 81f is an example of the "second planar surface portion" in the present invention.

The sectorial holes 81d is provided for receiving the plate-like support shafts 83 as shown in FIGS. 6 and 7. The sectorial holes 81d are so arranged that base portions 81i on the sides of circle centers are positioned upward, while the base portions 81i on the sides of the circle centers come into contact with upper surfaces of the support shafts 83 as shown in FIG.

7. Thus, the base portions 81*i* of the sectorial holes 81*d* are so formed as to receive the vertical load of the display body 10 through the display screen support member 81. The display screen support member 81 is formed to be rotatable in a sectorial angular range with respect to the support shafts 83 around the base portions 81*i* of the sectorial holes 81*d* supported by the platelike support shafts 83. In other words, the platelike support shafts 83 functions as the rotating shafts of the display screen support member 81. Thus, the display screen support member 81 is so formed that the display body 10 is rendered rotatable in the anteroposterior direction (along arrows C and D) with respect to the vertical plane of the display screen turning apparatus 20.

The pair of vertical support members 82 include turntable mounting portions 82*a* and rotating portion mounting portions 82*b* respectively, as shown in FIG. 6. A pair of screw mounting holes 82*c* are formed on the turntable mounting portions 82*a* of the vertical support members 82. The rotating portion mounting portions 82*b* of the vertical support members 82 are so provided as to extend upward (along arrow Z1) in the direction perpendicular to the surfaces of the turntable mounting portions 82*a* from first ends of the turntable mounting portions 82*a*.

The rotating portion mounting portions 82*b* of the vertical support members 82 are provided with sectorial holes 82*d*. The sectorial holes 82*d* are formed for receiving the platelike support shafts 83. As shown in FIG. 7, the sectorial holes 82*d* are so arranged that base portions 82*e* on the sides of circle centers are positioned downward, and the sectorial holes 82*d* come into contact with lower surfaces of the support shafts 83. Thus, the base portions 82*e* of the sectorial holes 82*d* are so formed as to receive the vertical load of the display body 10 through the display screen support member 81 and the support shafts 83. In other words, according to this embodiment, the vertical load of the display body 10 is received by the base portions 81*i* of the holes 81*d* of the display screen support member 81 and base portions 82*e* of the holes 82*d* of the vertical support members 82. The support shafts 83 are rendered rotatable in a sectorial angular range with respect to the vertical support members 82 around the base portions 82*e* of the sectorial holes 82*d*.

Each plate-shaped support shaft 83 made of sheet metal includes a pair of contact portions 83*a* and a rectangular hole 83*b*, as shown in FIG. 6. The pair of contact portions 83*a* of the support shaft 83 protrude from the rear ends of both side surfaces of the support shaft 83 extending in the longitudinal direction. These contact portions 83*a* are so provided as to come into contact with the corresponding pressure plate 86 of the display screen support member 81, as shown in FIG. 5. The rectangular hole 83*b* of the support shaft 83 is so provided as to receive the corresponding stop member 84, as shown in FIG. 6.

The pressure plates 85 and 86 are provided with rectangular holes 85*a* and 86*a* for receiving the support shafts 83 respectively, as shown in FIG. 6. The stop member 84 is provided for holding a state of inserting the support shaft 83 into the hole 86*a* of the pressure plate 86, the hole 81*d* of the display screen support member 81, the hole 82*d* of the vertical support members 82 and the hole 85*a* of the pressure plates 85. When the support shaft 83 is inserted into the stop member 84, the support shaft 83 is inserted into the hole 83*b* of the support shaft 83 on the side of the pressure plate 85.

The transmission gear portion 51 is so formed that a gear 53 made of resin, a torque limiter 70, a gear 54 and a gear 55 made of resin are arranged in a gear box 56 made of resin as shown in FIG. 3. As shown in FIGS. 3 and 5, the gear 53 made of resin integrally includes a large-diametral gear portion 53*a* and a small-diametral gear portion 53*b*. The gear 54 made of resin integrally includes a large-diametral gear portion 54*a* and a small-diametral gear portion 54*b*. The gear 55 made of resin integrally includes a large-diametral gear portion 55*a* and a small-diametral gear portion 55*b*.

As shown in FIGS. 3 and 5, a worm gear 57 made of resin is press-fitted into the rotating shaft of the stepping motor 52. The worm gear 57 meshes with the large-diametral gear portion 53*a* of the gear 53 so that the rotating shaft is orthogonal thereto. Therefore, driving force generated by the stepping motor 52 is transmitted to the gear 53 through the worm gear 57, while driving force generated by the gear 53 and the gear group subsequent thereto cannot rotate the worm gear 57 and the stepping motor 52. In other words, only the driving force generated by the stepping motor 52 is transmitted to the transmission gear portion 51 through the worm gear 57.

As shown in FIGS. 3 and 5, the small-diametral gear portion 53*b* of the gear 53 meshes with a driving gear 72 of the torque limiter 70. A driven gear 71 of the torque limiter 70 meshes with the large-diametral gear portion 54*a* of the gear 54, while the small-diametral gear portion 54*b* of the gear 54 meshes with the large-diametral gear portion 55*a* of the gear 55. The small-diametral gear portion 55*b* of the gear 55 horizontally meshes with a gear portion 62*a* of a rack gear 62. Therefore, the driving force of the stepping motor 52 is transmitted to the rack plate 60 through the worm gear 57, the gear 53, the torque limiter 70, the gears 54 and 55 and the rack gear 62.

As shown in FIGS. 3 and 5, the horizontal turning/driving portion 40 is constituted by a transmission gear portion 41 for rotating the turntable 31 provided on the base portion 30 in the horizontal direction (along arrow A or B in FIG. 1) in the horizontal plane and a stepping motor 42 serving as a driving source for the transmission gear portion 41. The horizontal turning/driving portion 40 is formed to be arranged in the base portion 30, as shown in FIGS. 3 and 4. The transmission gear portion 41 is so formed that a gear 43 of resin, a torque limiter 75 and gears 44 and 54 made of resin are arranged in a gear box 46 made of resin, as shown in FIG. 3.

As shown in FIGS. 3 and 5, the worm gear 47 made of resin is press-fitted into the rotating shaft of the stepping motor 42. The gear 43 integrally includes a large-diametral gear portion 43*a* and a small-diametral gear portion 43*b*. The gear 44 integrally includes a large-diametral gear portion 44*a* and a small-diametral gear portion 44*b*. The gear 45 integrally includes a large-diametral gear portion 45*a* and a small-diametral gear portion 45*b*. A turning gear member 48 made of resin is fixed to the upper surface 31*a* of the turntable 31 of the base portion 30 with four screws 90.

As shown in FIGS. 3 and 5, the worm gear 47 meshes with the large-diametral gear portion 43*a* of the gear 43 so that the rotating shaft thereof is orthogonal thereto, while the small-diametral gear portion 43*b* of the gear 43 meshes with a driving gear 77 of the torque limiter 75. A driven gear 76 of the torque limiter 75 meshes with the large-diametral gear portion 44*a* of the gear 44, while the small-diametral gear portion 44*b* of the gear 44 meshes with the large-diametral gear portion 45*a* of the gear 45. The small-diametral gear portion 45*b* of the gear 45 meshes with a turning gear portion 48*a* of the turning gear member 48. Therefore, driving force of the stepping motor 42 is transmitted to the turntable 31 through the worm gear 47, the gear 43, the torque limiter 75, the gears 44 and 45 and the turning gear member 48.

The torque limiters 70 and 75 provided in the transmission gear portions 51 and 41 are so formed as to transmit the driving force of the stepping motors 52 and 42 to the transmission gear portions 51 and 41 when the driving force of the stepping motors 52 and 42 is not more than prescribed torque and not to transmit the driving force of the stepping motors 52 and 42 to the transmission gear portions 51 and 41 when the driving force of the stepping motors 52 and 42 exceeds the prescribed torque.

The display body 10 includes a front cabinet 11 made of resin and a rear cabinet 12 made of resin, as shown in FIGS. 1 and 2. Screws 90 are so threaded into screw mounting holes (not shown) of the rear cabinet 12 through the screw receiving holes 81*c* (see FIG. 2) of the display screen support member 81 as to mount the display body 10 on the display screen support member 81. The rear cabinet 12 is integrally provided with a notched portion 12*a* for concealing the display screen support member 81. A plurality of screw receiving holes 12*b* are provided on the outer peripheral portion of the rear cabinet 12, so that the rear cabinet 12 is mounted on the front cabinet 11 with screws 91.

In the display screen turning apparatus 20, a cover member 21 made of resin is mounted on the base member 34 with screws (not shown) inserted from the lower surface of the base member 34 of the base portion 30, as shown in FIG. 4. As shown in FIGS. 1 and 4, another cover member 22 made of resin is mounted on the upper surface 31*a* of the turntable 31 with screws (not shown), to cover the base portion 30 from above and to be horizontally turnable (along arrows A and B in FIG. 1) integrally with the turntable 31 of the base portion 30. As shown in FIGS. 2 and 4, the cover member 22 made of resin is provided with a notched portion 22*a* for arranging the display screen support mechanism 80 (display screen support member 81) to be rotatable in the anteroposterior direction (along arrows C and D in FIG. 1).

Anteroposterior and horizontal turning operations of the display screen turning apparatus 20 according to the embodiment will be now described with reference to FIGS. 1, 3, 4 and 9 to 20.

When the display screen turning apparatus 20 rotates the display screen support mechanism 80 in the anteroposterior direction (along arrows C and D) with respect to the vertical plane as shown in FIG. 4, the display body 10 is rotated upward and downward, and hence the anteroposterior direction is hereinafter referred to as upward and downward directions.

Upward and downward turning operations (along arrows C and D in FIG. 1) of the display screen turning apparatus 20 will be now described.

In the state where the display screen support member 81 is perpendicular to the turntable 31 provided on the base portion 30 and directed frontward (the central portion of the turning gear portion 48*a* of the turning gear member 48 meshes with the small-diametral gear portion 45*b* of the gear 45, and directions along arrows S and T which are the meshing direction of the rack gear 63 and the rotating gear 87 and directions along arrows P and Q which are a linear movement direction of the plate member 61 of the rack plate 60 coincide with each other) as shown in FIG. 3, the user presses an upward tilt button (not shown) of an attached remote control (not shown), thereby transmitting a signal for turning the display body 10 (see FIG. 1) upward (along arrow C in FIG. 1) to a control circuit portion (not shown) of the display body 10. The stepping motor 52 of the display screen turning apparatus 20 is driven on the basis of this signal. More specifically, the worm gear 57 mounted on the stepping motor 52 is rotated following the driving of the stepping motor 52, while the driving gear 72 of the torque limiter 70 is rotated along arrow E1 through the gear 53, as shown in FIG. 3. The driven gear 71 of the torque limiter 70 is also rotated along arrow E1, while the gear 55 is rotated along arrow E2 through the gear 54. Thus, the plate member 61 of the rack plate 60 moves along arrow P with the rack gear 62 horizontally meshing with the gear 55, following the rotation of the gear 55 along arrow E2.

Figure 9:
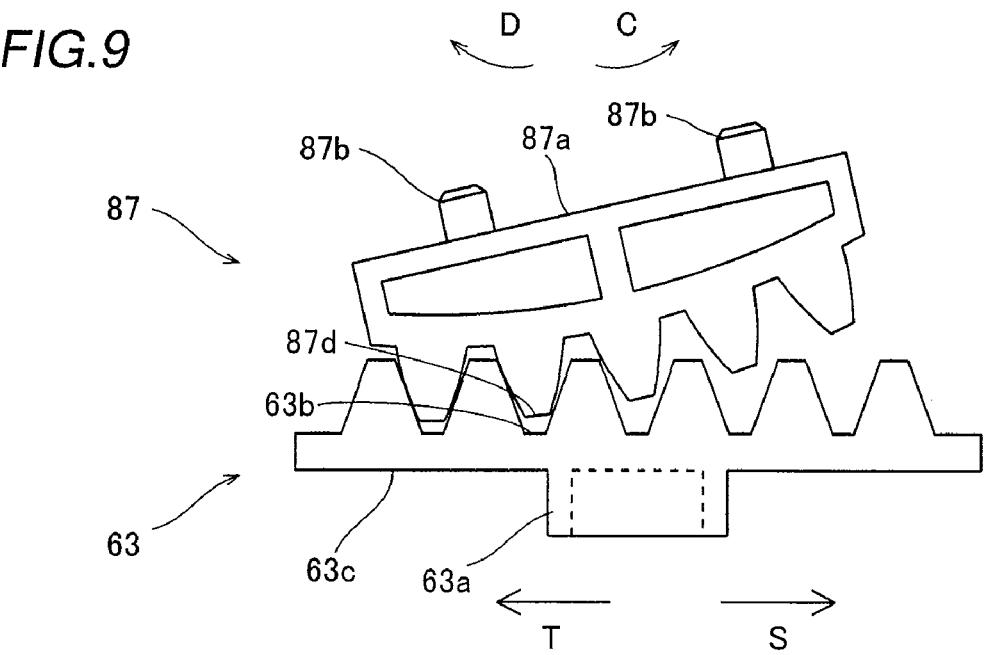
FIG. 9 is a diagram showing the meshing state of the rack gear and the rotating gear when moving the rack gear along arrow S, according to the embodiment of the present invention.

According to this embodiment, the plate member 61 so moves along arrow P that the rack gear 63 having the protrusion 63*a* inserted into the receiving hole 61*c* of the plate member 61 also moves along arrow S following the plate member 61. When the rack gear 63 moves along arrow S, therefore, the rotating gear 87 meshing with the rack gear 63 is rotated along arrow C while maintaining in a state of meshing with at least two teeth, as shown in FIG. 9. Consequently, the display screen support member 81 is turned upward (along arrow C) as shown in FIG. 10.

At this time, the display screen support member 81 and the support shafts 83 integrally rotate around rotation centers of the base portions 82*e* of the sectoral holes 82*d* of the vertical support members 82 along arrow C while the base portions 81*i* of the sectoral holes 81*d* of the display screen support member 81 and the upper surfaces of the support shafts 83 come into contact with each other. Following the driving of the stepping motor 52 (see FIG. 3), the display screen support member 81 mounted with the display body 10 continuously turns along arrow C at a prescribed turning speed.

When turning the display screen support member 81 along arrow C up to a desired angle, the user releases the upward tilt button (not shown) of the attached remote control (not shown), so that the signal for turning the display body 10 (see FIG. 1) upward (along arrow C) is not transmitted to the control circuit portion (not shown) of the display body 10. Therefore, driving of the stepping motor 52 is stopped. Thus, the display screen support member 81 stops turning along arrow C and stands still.

Figure 10:
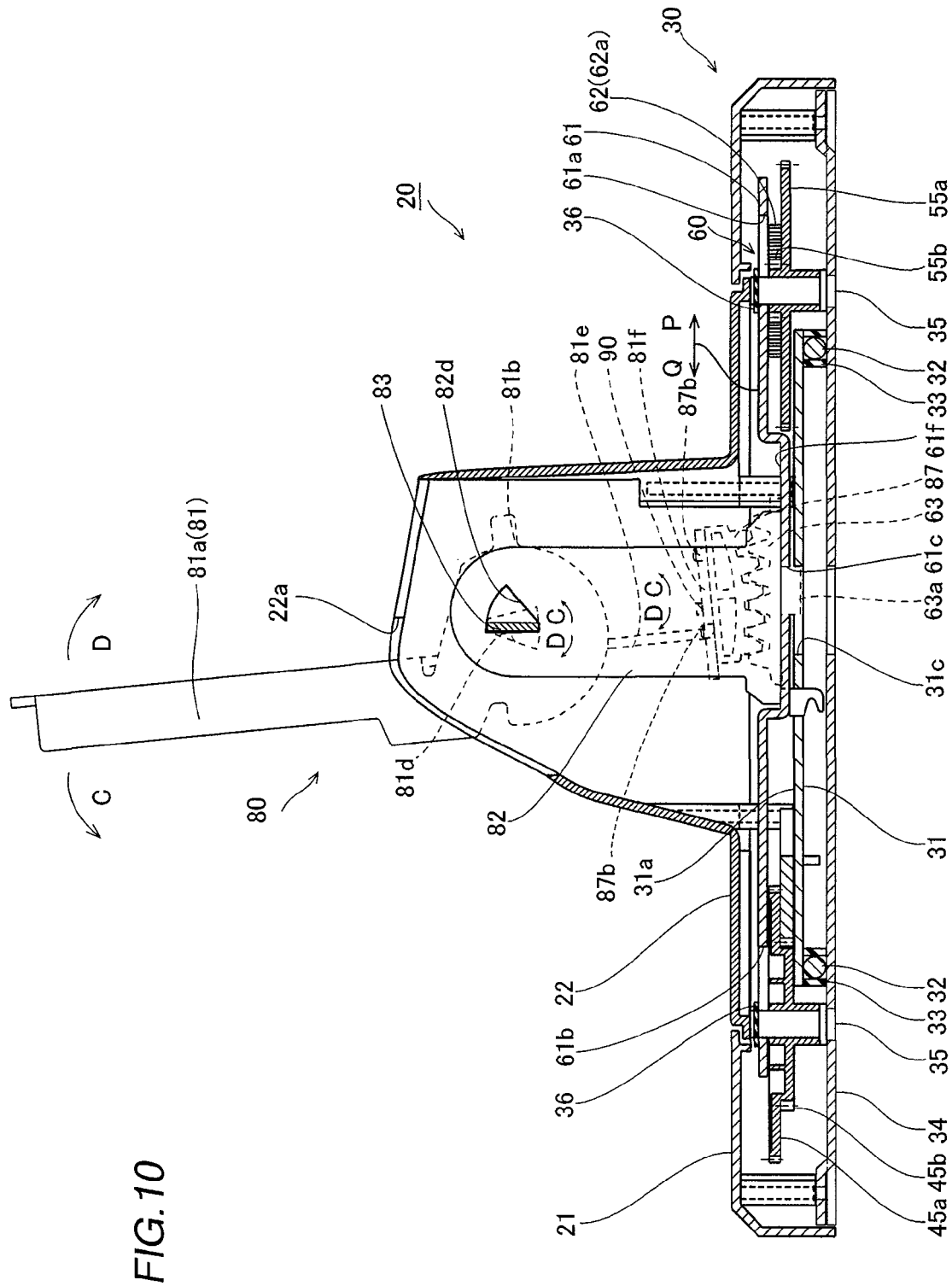
FIG. 10 is a sectional view for illustrating an upward turning operation (along arrow C) of the display screen turning apparatus according to the embodiment of the present invention shown in FIG. 1.

When the user continuously turns the display body 10 (see FIG. 1) upward (along arrow C), the rack plate 60 slides along arrow P the and first ends of the inner side surfaces of the slots 61*a* and 61*b* provided on the plate member 61 come into contact with the side surfaces of the boss member 35 respectively, so that the rack plate 60 is inhibited from the sliding along arrow P, as shown in FIG. 10. At this time, the display screen support member 81 reaches a prescribed turning angle. Therefore, the display body 10 stops turning along arrow C and stands still. While the stepping motor 52 (see FIG. 3) is continuously driven at this time, the driving force thereof is not transmitted to the transmission gear portion 51 when exceeding the prescribed torque. When the movement (sliding) of the rack plate 60 along arrow P is stopped, therefore, the rotation is stopped regardless of the driving of the stepping motor 52.

As shown in FIG. 3, in the state where the display screen support member 81 is perpendicular to the turntable 31 provided on the base portion 30 and directed frontward, the user presses a downward tilt button (not shown) of an attached remote control (not shown), thereby transmitting a signal for turning the display body 10 (see FIG. 1) downward (along arrow D in FIG. 1) to the control circuit portion (not shown) of the display body 10 and driving the stepping motor 52 of the display screen turning apparatus 20. Thus, the worm gear 57 mounted on the stepping motor 52 is rotated, while the driving gear 72 of the torque limiter 70 is rotated along arrow F1 through the gear 53. The driven gear 71 of the torque limiter 70 is also rotated along arrow F1, while the gear 55 is rotated along arrow F2 through the gear 54. The rack plate 60 moves along arrow Q with the rack gear 62.

Figure 11:
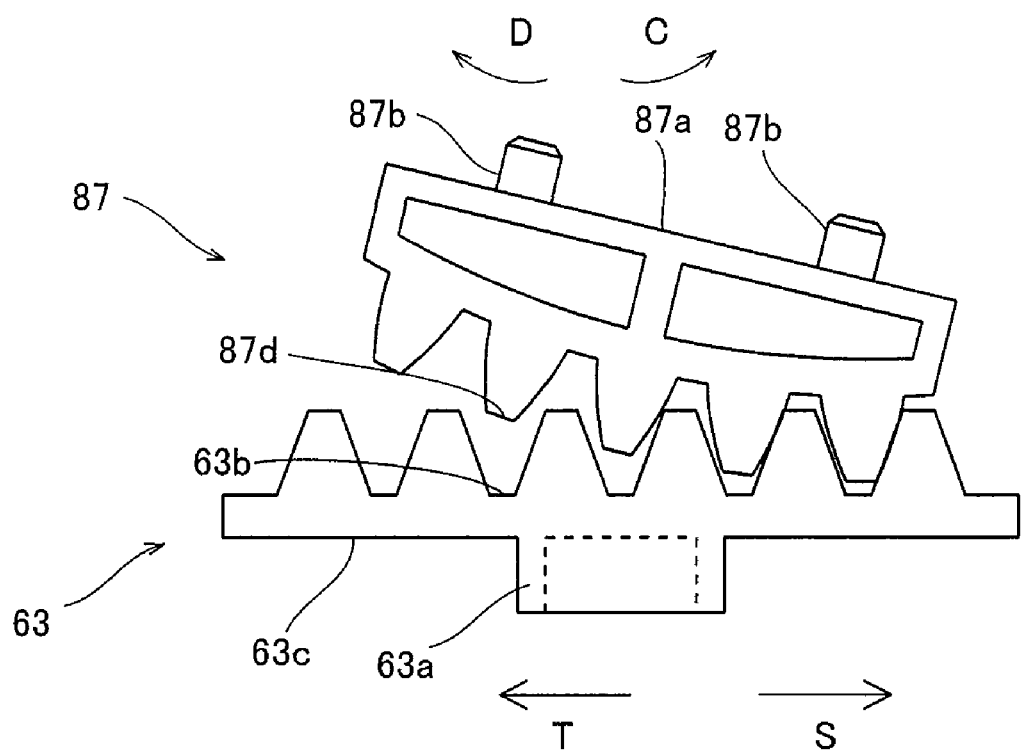
FIG. 11 is a diagram showing the meshing state of the rack gear and the rotating gear when moving the rack gear along arrow T, according to the embodiment of the present invention.

According to this embodiment, the plate member 61 so moves along arrow Q that the rack gear 63 having the protrusion 63*a* inserted into the receiving hole 61*c* of the plate member 61 also moves along arrow T following the plate member 61. When the rack gear 63 of the rack plate 60 moves along arrow T, therefore, the rotating gear 87 meshing with the rack gear 63 is rotated along arrow D while maintaining the state of meshing with at least two teeth, as shown in FIG. 11. Consequently, the display screen support member 81 is turned downward (along arrow D) at a prescribed rotational speed, as shown in FIG. 12.

At this time, the display screen support member 81 and the support shafts 83 integrally rotate around the rotation centers of the base portions 82e of the sectoral holes 82d of the vertical support members 82 along arrow D while the base portions 81i of the sectoral holes 81d of the display screen support member 81 and the upper surfaces of the support shafts 83 come into contact with each other.

When turning the display body 10 (see FIG. 1) along arrow D up to a desired angle, the user releases the downward tilt button (not shown) of the attached remote control (not shown), so that the signal for turning the display body 10 downward (along arrow D) is not transmitted to the control circuit portion (not shown) of the display body 10 and driving of the stepping motor 52 is stopped. Thus, the display screen support member 81 stops turning along arrow D, and stands still.

Figure 12:
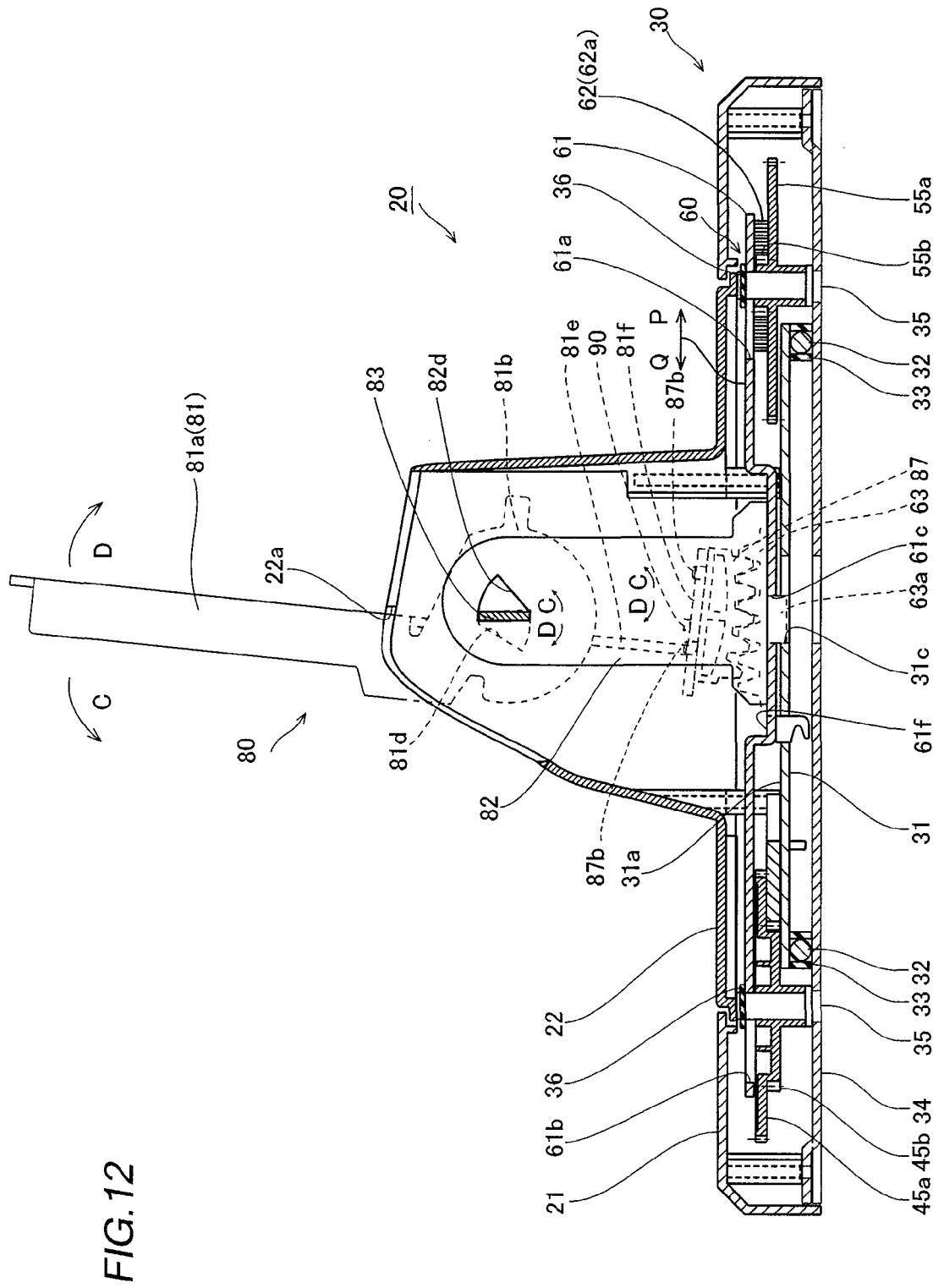
FIG. 12 is a sectional view for illustrating a downward turning operation (along arrow D) of the display screen turning apparatus according to the embodiment of the present invention shown in FIG. 1.

When the user continuously turns the display body 10 (see FIG. 1) downward (along arrow D), second end portions of the inner side surfaces of the slots 61a and 61b provided on the plate member 61 come into contact with the side surfaces of the boss member 35 respectively, so that the rack plate 60 slid along arrow Q is inhibited from the sliding along arrow Q, as shown in FIG. 12. Therefore, the display body 10 stops turning along arrow D and stands still. While the stepping motor 52 (see FIG. 3) is continuously driven at this time, the driving force thereof is not transmitted to the transmission gear portion 51 when exceeding the prescribed torque. When the movement (sliding) of the rack plate 60 along arrow Q is stopped, therefore, the rotation is stopped regardless of the driving of the stepping motor 52.

A horizontal turning operation of the display screen turning apparatus 20 in the horizontal plane will be now described.

Figure 13:
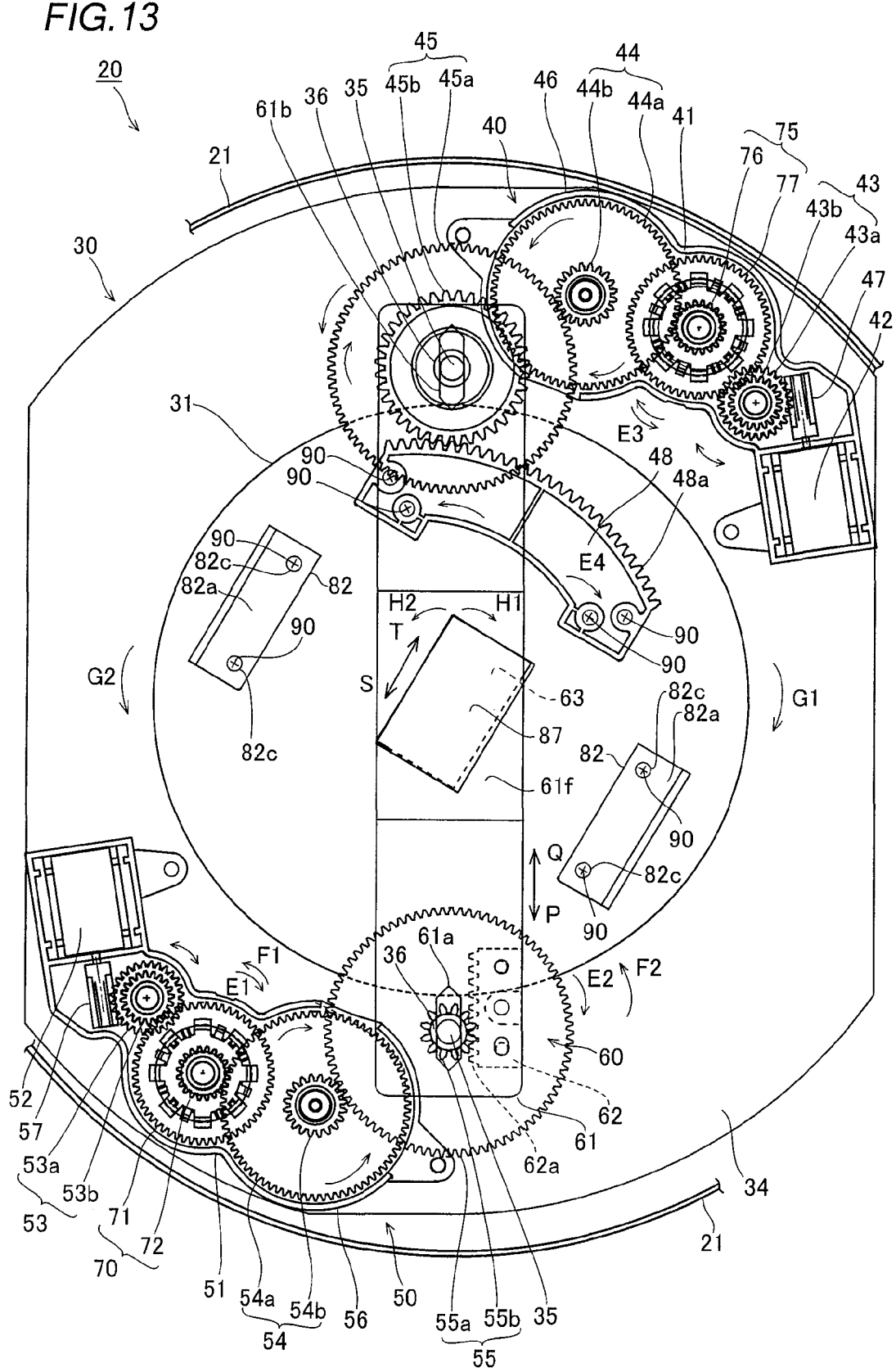
FIG. 13 is a plan view for illustrating a leftward turning operation (along arrow A) of the display screen turning apparatus according to the embodiment of the present invention shown in FIG. 1.

As shown in FIG. 4, in the state where the display screen support member 81 is perpendicular to the turntable 31 provided on the base portion 30 and directed frontward, the user presses a horizontal turn button (not shown) of the attached remote control (not shown), thereby transmitting a signal for turning the display body 10 (see FIG. 1) leftward (along arrow A in FIG. 1) to the control circuit portion (not shown) of the display body 10 and driving the stepping motor 42 of the display screen turning apparatus 20. More specifically, the worm gear 47 mounted on the stepping motor 42 is rotated following the driving of the stepping motor 42, while the driving gear 77 of the torque limiter 75 is rotated along arrow E3 through the gear 43, as shown in FIG. 13. The driven gear 76 of the torque limiter 75 is also rotated along arrow E3, while the turning gear member 48 is rotated along arrow E4 through the gears 44 and 45. Thus, the turntable 31 provided on the base portion 30 mounted with the display screen support member 81 is turned along arrow G1, thereby turning the display body 10 leftward (along arrow A in FIG. 1) at a prescribed rotational speed.

Figure 14:
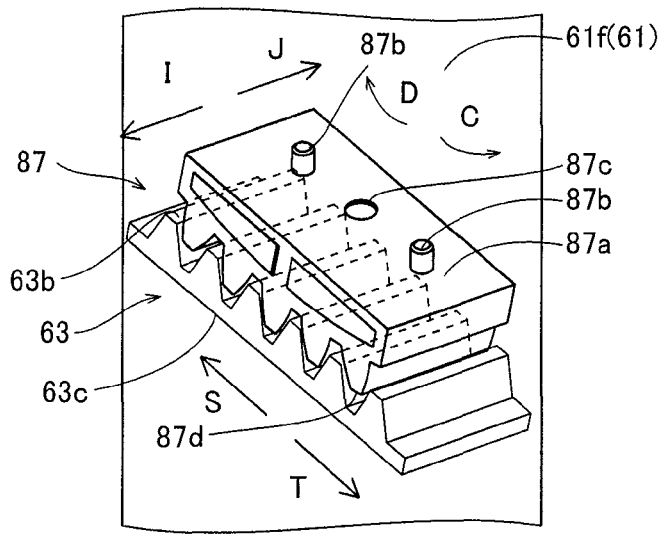
FIG. 14 is a diagram showing the meshing state of the rack gear and the rotating gear when turning the display screen turning apparatus leftward (along arrow A), according to the embodiment of the present invention.

At this time, the rotating gear 87 fixed to the display screen support member 81 is also rotated along arrow H1, following the turning of the display screen support member 81, as shown in FIG. 13. Further, the rack gear 63 so arranged as to mesh with the rotating gear 87 is also rotated following the rotation of the rotational gear 87 while maintaining the meshing state, as shown in FIG. 14. The rack gear 63 and the rotating gear 87 are so positioned on the horizontal rotation centers (along arrows G1 and G2) of the turntable 31 and the display screen support member 81 that the rack gear 63 rotates around the protrusion 63a along arrow H following the turning operation of the turntable 31 but not moves from an initial position. Therefore, the rack gear 63 does not move from the initial position, and hence the rack plate 60 provided with the rack gear 63 does not linearly move (slide) along arrows P and Q when the rack gear 63 moves. Thus, the display body 10 can be inhibited from turning upward and downward (along arrow C and D in FIG. 1) in the leftward turning operation of the display body 10.

When turning the display body 10 (see FIG. 1) up to a desired angle, the user releases the horizontal turn button (not shown) of the attached remote control (not shown), so that the signal for turning the display body 10 leftward (along arrow A in FIG. 1) is not transmitted to the control circuit portion (not shown) of the display body 10 and the driving of the stepping motor 42 is stopped. Thus, the base portion 30 stops turning along arrow G1 and stands still, as shown in FIGS. 13 and 15.

When the turning angle of the base portion 30 reaches the maximum (30° in this embodiment) while the user continuously turns the display body 10 (see FIG. 1) leftward (along arrow A in FIG. 1), the turntable 31 comes into contact with a stopper member (not shown) provided in the base portion 30, so that the leftward turning (along arrow A in FIG. 1) is regulated. Therefore, the base portion 30 stops turning along arrow G1 and stands still. While the stepping motor 42 (see FIG. 13) is continuously driven at this time, the driving force thereof is not transmitted to the transmission gear portion 41 (see FIG. 13) when exceeding the prescribed torque. When the turntable 31 comes into contact with the stopper member (not shown), therefore, the rotation is stopped regardless of the driving of the stepping motor 42.

While the above turning operation has been described with reference to the case of turning the base portion 30 along arrow G1 in FIGS. 3 and 13, the horizontal turning/driving portion 40 performs a turning operation similar to the above also in a case of turning the turntable 31 along arrow G2 opposite to arrow G1. Therefore, the display body 10 (see FIG. 1) can be turned rightward (along arrow B in FIG. 1) by turning the turntable 31 along arrow G2.

Figure 15:
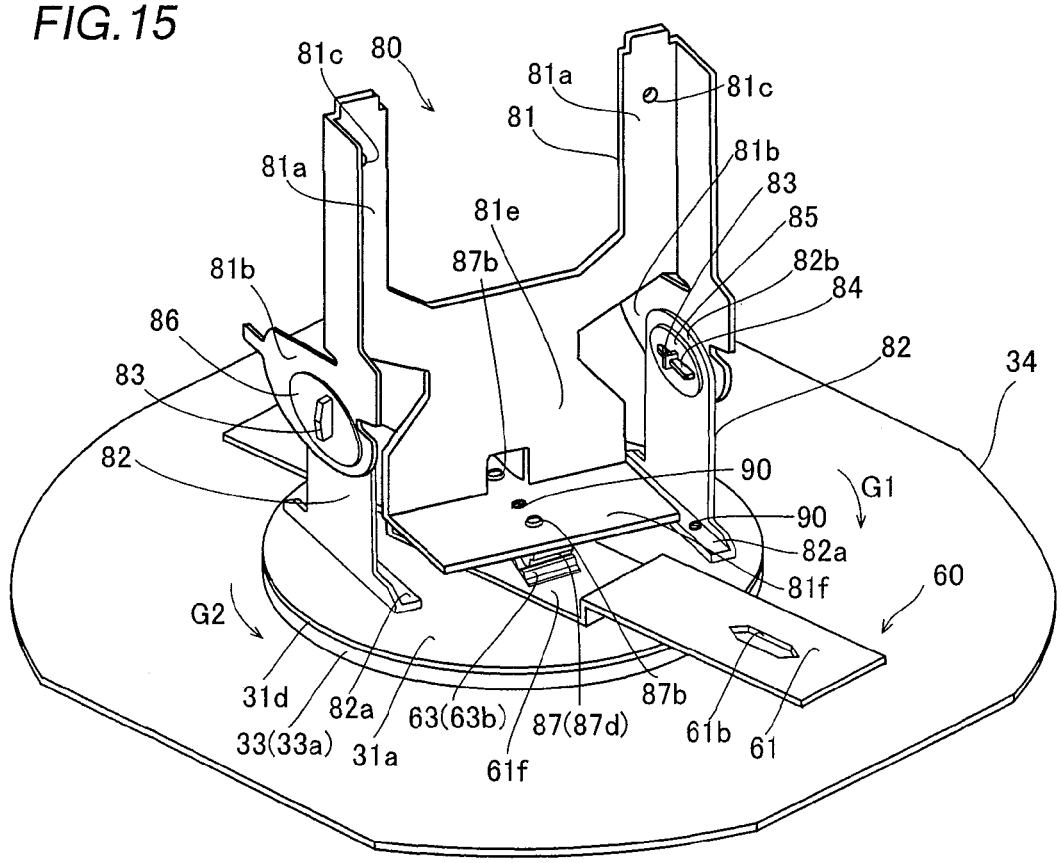
FIG. 15 is a perspective view for illustrating the leftward turning operation (along arrow A) of the display screen turning apparatus according to the embodiment of the present invention shown in FIG. 1.

A downward turning operation (along arrow D in FIG. 1) of the display body 10 (see FIG. 1) in a state where the display body 10 vertically placed on the base portion 30 is rotated leftward (along arrow A in FIG. 1) by a prescribed angle as shown in FIGS. 13 and 15 will be now described.

Figure 16:
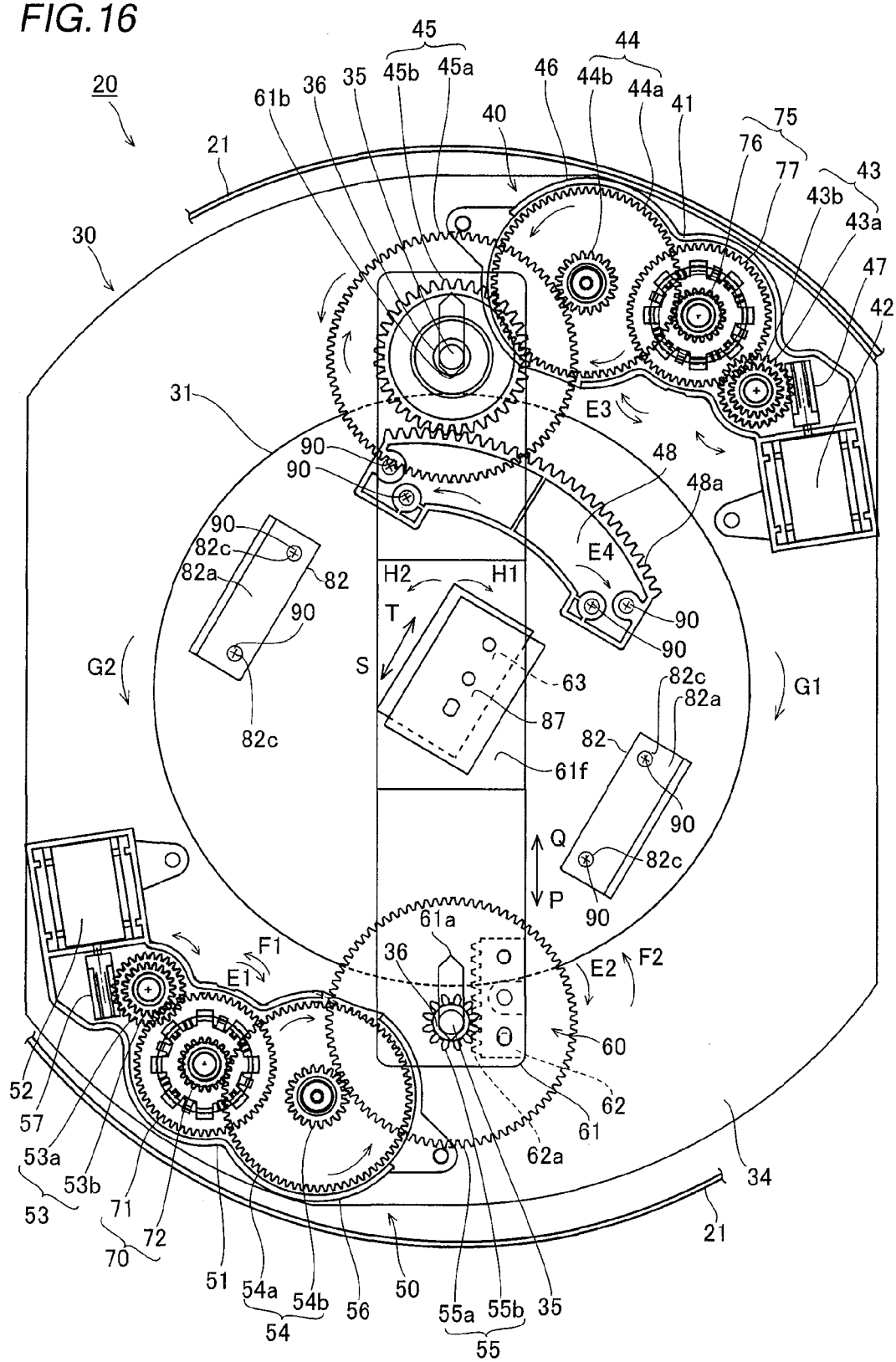
FIG. 16 is a plan view for illustrating the downward turning operation (along arrow D) of the display screen turning apparatus when turning the display screen turning apparatus leftward (along arrow A), according to the embodiment of the present invention shown in FIG. 1.

As shown in FIGS. 13 and 15, in a state where the turntable 31 on the base portion 30 is turned leftward (along arrow G1) by a prescribed angle and the turning operation is stopped (the directions along arrows S and T which are the meshing direction of the rack gear 63 and the rotating gear 87 and the directions along arrows P and Q which are the linear movement direction of the plate member 61 of the rack plate 60 coincide with each other), the user presses the downward tilt button (not shown) of the attached remote control (not shown), thereby starting driving of the vertical turning/driving portion 50 (see FIG. 13) similarly to the above. In other words, the rack plate 60 start moving (sliding) along arrow Q from a position shown in FIG. 13, as shown in FIG. 16.

Figure 17:
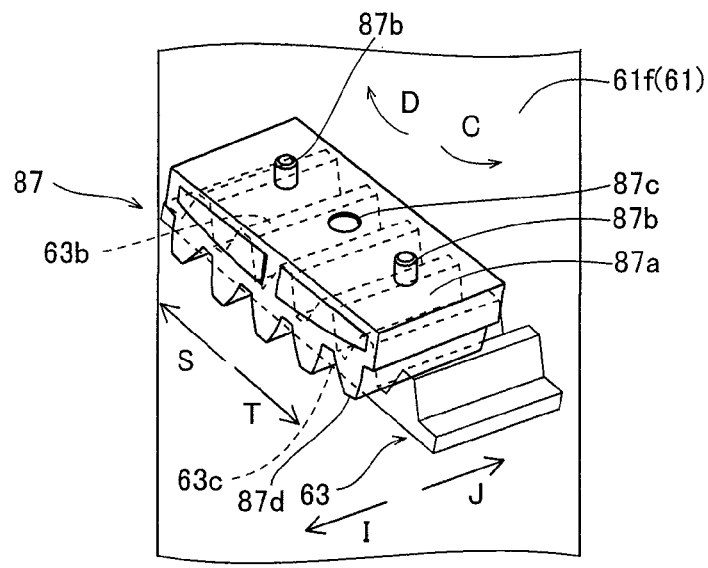
FIG. 17 is a diagram showing the meshing state of the rack gear and the rotating gear when turning the display screen turning apparatus leftward (along arrow A) and downward (along arrow D), according to the embodiment of the present invention shown in FIG. 1.
Figure 18:
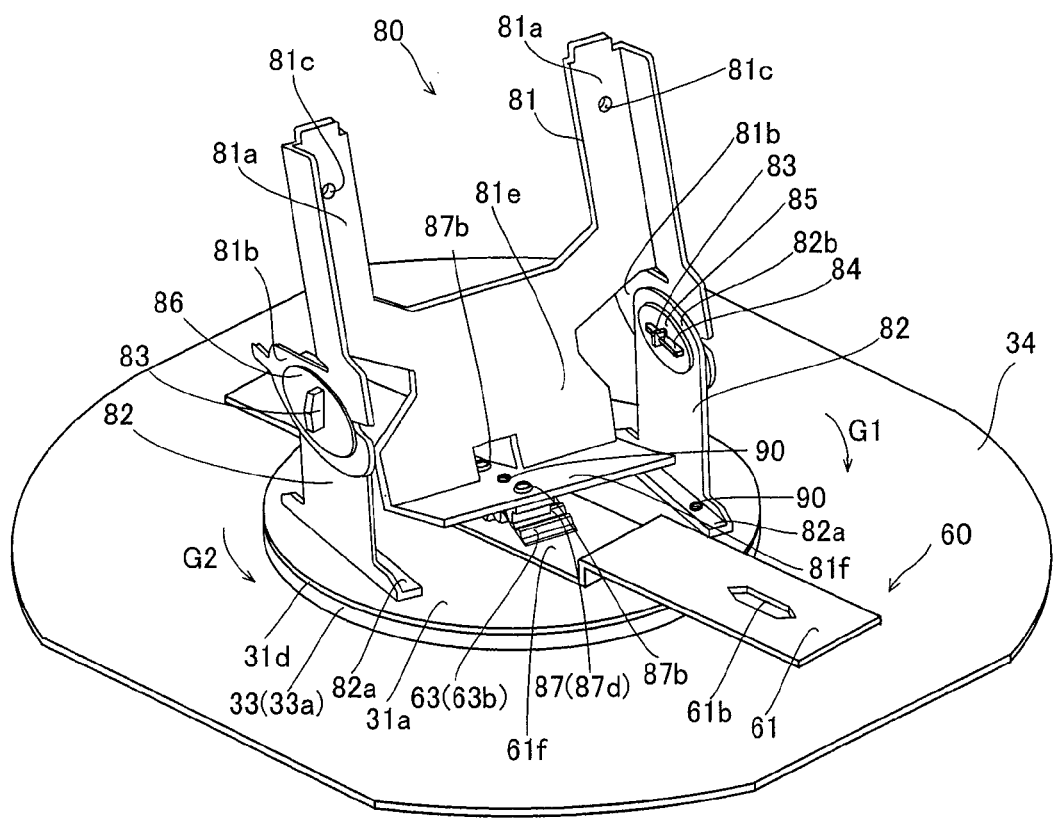
FIG. 18 is a perspective view for illustrating the downward turning operation (along arrow D) of the display screen turning apparatus when turning the display screen turning apparatus leftward (along arrow A), according to the embodiment of the present invention shown in FIG. 1.

According to this embodiment, the rack gear 63 also moves along arrow Q, namely a direction different to the meshing direction (along arrows S and T) of the rack gear 63 and the rotating gear 87 following movement of the rack plate 60 along arrow Q. Thus, the rotating gear 87 is slidable on the rack gear 63 in a direction (along arrows I and J) perpendicular to the meshing direction (along arrows S and T) of the rack gear 63 and the rotating gear 87, and hence the rotating gear 87 meshing with the rack gear 63 of the rack plate 60 is rotated along arrow D while sliding along arrow I in a state of meshing with at least two teeth, as shown in FIG. 17. Thus, the display screen support member 81 fixed with the rotating gear 87 is turned downward (along arrow D).

The subsequent turning operation is similar to the downward operation (along arrow D in FIG. 1) of the display body 10 from a state where the display body 10 (see FIG. 1) does not turn in the horizontal direction (along arrows A and B in FIG. 1) described above. At this time, the rotating gear 87 slides while holding a state of meshing with the rack gear 63 and turns downward (along arrow D) in a leftward rotational range (along arrow A in FIG. 1) and a downward rotational range (along arrow D in FIG. 1) of the display body 10 (see FIG. 1). While the rotating gear 87 slides along arrow I in the leftward rotational range (along arrow A in FIG. 1) and the downward rotational range (along arrow D in FIG. 1) of the display body 10 (see FIG. 1), a lateral side of the teeth of the rotating gear 87 along arrow J is always meshes with the rack gear 63. In other words, a state where the rack gear 63 and the rotating gear 87 overlap with each other in plan view is kept.

Figure 19:
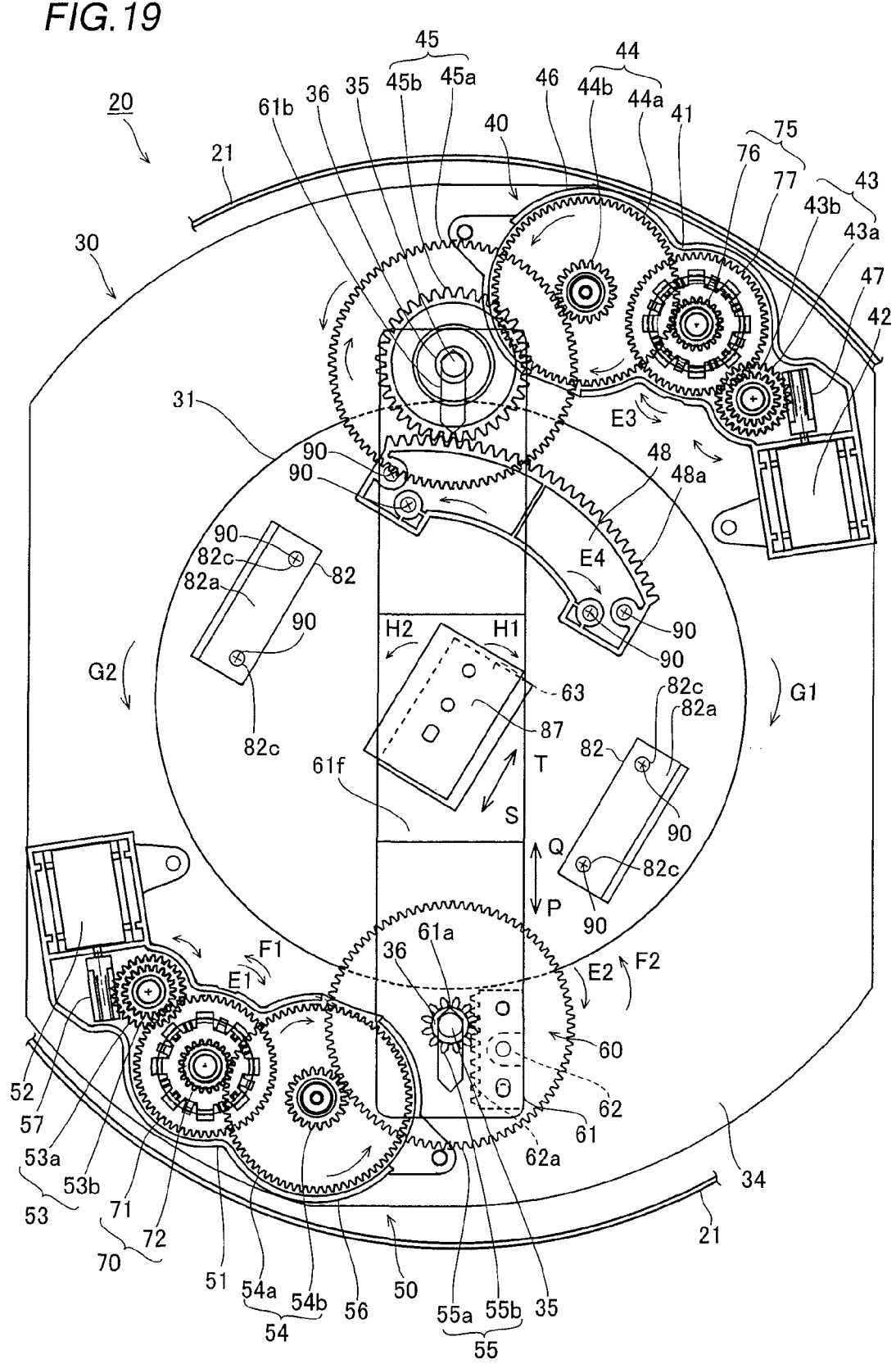
FIG. 19 is a plan view for illustrating the upward turning operation (along arrow C) of the display screen turning apparatus when turning the display screen turning apparatus leftward (along arrow A), according to the embodiment of the present invention shown in FIG. 1.
Figure 20:
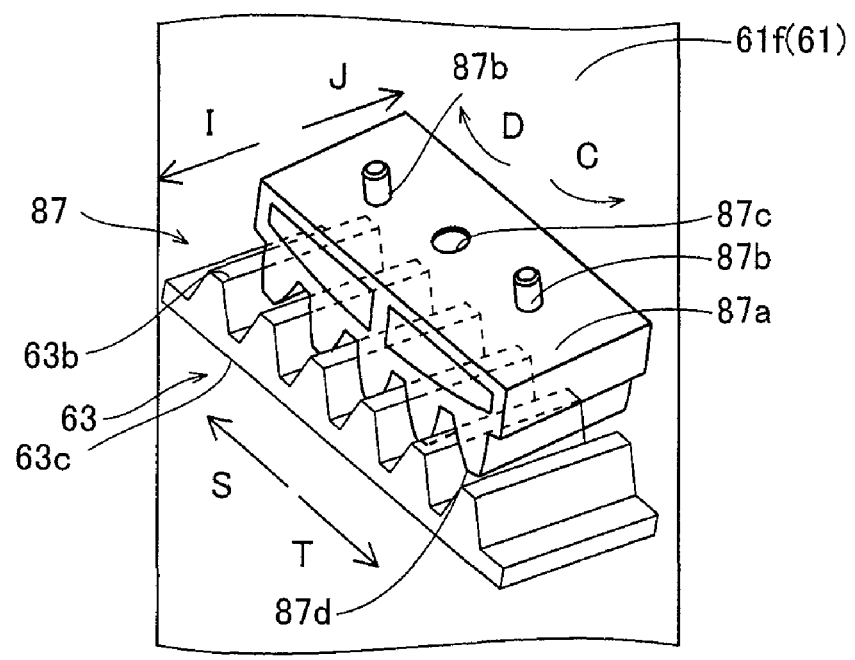
FIG. 20 is a diagram showing the meshing state of the rack gear and the rotating gear when turning the display screen turning apparatus leftward (along arrow A) and upward (along arrow C), according to the embodiment of the present invention shown in FIG. 1.

The upward turning operation (along arrow C in FIG. 1) of the display body 10 from the state of turning the display body 10 (see FIG. 1) leftward (along arrow A in FIG. 1) by the prescribed angle as shown in FIG. 19 is also the same as the aforementioned downward turning operation (along arrow D in FIG. 1) of the display body 10 from the state of turning the display body 10 leftward (along arrow A in FIG. 1) by the prescribed angle by rotating the rotating gear 87 meshing with the rack gear 63 along arrow C while sliding along arrow J as shown in FIG. 20. At this time, while the rotating gear 87 slides along arrow J in the leftward rotational range (along arrow A in FIG. 1) and the upward rotational range (along arrow C in FIG. 1) of the display body 10 (see FIG. 1), a lateral side of the teeth of the rotating gear 87 along arrow I always meshes with the rack gear 63. In other words, a state where the rack gear 63 and the rotating gear 87 overlap with each other in plan view is kept.

The upward and downward turning operation (along arrows C and D in FIG. 1) of the display body 10 from the state of turning the display body 10 (see FIG. 1) rightward (along arrow B in FIG. 1) by the prescribed angle is also the same as the aforementioned upward turning operation (along arrow C in FIG. 1) of the display body 10 from the state of turning the display body 10 leftward (along arrow A in FIG. 1) by the prescribed angle.

Also when the display body 10 is turned in the horizontal direction (along arrows A and B in FIG. 1) from the state of turning the display body 10 (see FIG. 1) upward and downward (along arrows C and D in FIG. 1) by prescribed angle, an operation similar to the aforementioned horizontal turning operation is performed while the rack gear 63 and the rotating gear 87 mesh with each other.

According to this embodiment, as hereinabove described, the rotating gear 87 meshed with the rack gear 63 moves by movement of the rack gear 63 following linear movement of the rack plate 60 along arrows P and Q (see FIG. 3) in the horizontal plane, so that the display screen support member 81 rotates in the anteroposterior direction (along arrows C and D in FIG. 1) by the prescribed angle with respect to the vertical plane, whereby the influence of the weight, acting vertically downward, of the display body 10 can be reduced by rotating the display screen support member 81 in the anteroposterior direction by linear movement of the rack plate 60 along arrows P and Q in the horizontal plane, as compared with a case where the display screen support member 81 is rotated in the anteroposterior direction by moving the rack plate 60 vertically upward to apply pressing force from below to the display screen support member 81, and hence the display screen support member 81 can be rotated in the anteroposterior direction by the prescribed angle with respect to the vertical plane without large force. The rack gear 63 and the rotating gear 87 which are gear members are employed, whereby force disperses to a plurality of teeth of the gear, and hence it is possible to suppress breakage of components for rotating the display screen support member 81 in the anteroposterior direction by the prescribed angle with respect to the vertical plane, as compared with a case where a screw member so formed that the weight, acting vertically downward, of the display body 10 substantially concentrates on a point and so provided as to move vertically, or a coupling member so formed that a load by the weight of the display body 10 is applied to a fixed portion is employed.

According to this embodiment, the cylindrical protrusion 63a is provided on the rear surface 63c of the rack gear 63 and the circular receiving hole 61c receiving the protrusion 63a rotatably along arrows H1 and H2 (see FIG. 3) in the horizontal plane with respect to the rack plate 60 is provided on the rack plate 60, whereby the rotating gear 87 and the rack gear 63 can easily mesh with each other even when the display screen support member 81 rotates by the prescribed angle in the horizontal plane, and hence the display screen support member 81 can be rotated in the anteroposterior direction (along arrows C and D in FIG. 1) by the prescribed angle with respect to the vertical plane.

According to this embodiment, the rotating gear 87 is fixed so as not to rotate with respect to the display screen support member 81 and the rack gear 63 is rendered rotatable along arrows H1 and H2 (see FIG. 3) in the horizontal plane through the rotating gear 87 following the rotation of the display screen support member 81 along arrows G1 and G2 (see FIG. 3) in the horizontal plane, whereby no member is not required for rotating the rack gear 63 along arrows H1 and H2 and hence increase in the number of components can be suppressed.

According to this embodiment, the rotating gear 87 meshed with the rack gear 63 is rendered movable in the meshing direction and slidable with respect to the rack gear 63 in the direction perpendicular to the meshing direction (along arrows I and J in FIG. 14) following the movement of the rack gear 63, in a case where the rack gear 63 moves following linear movement of the rack plate 60 along arrows P and Q in the horizontal plane in a state where the movement direction of the rack plate 60 (along arrows P and Q in FIG. 3) and the meshing direction (along arrows S and T in FIG. 3) of the rotating gear 87 and the rack gear 63 are different from each other by rotating the rotating gear 87 and the rack gear 63 along arrows H1 and H2 (see FIG. 3) following rotation of the display screen support member 81 along arrows G1 and G2 (see FIG. 3) in the horizontal plane, whereby a meshing state of the rotating gear 87 and the rack gear 63 is maintained by slide of the rotating gear 87 with respect to the rack gear 63 in the direction perpendicular to the meshing direction, also when the movement direction of the rack plate 60 and the meshing direction of the rotating gear 87 and the rack gear 63 are different from each other. Thus, the display screen support member 81 can be rotated in the anteroposterior direction (along arrows C and D in FIG. 1) by the prescribed angle with respect to the vertical plane by linear movement of the rack plate 60, also when the movement direction of the rack plate 60 and the meshing direction of the rotating gear 87 and the rack gear 63 are different from each other.

According to this embodiment, the lower surface (tooth flank) 87d of the rotating gear 87 is circularly formed to be convexed toward rack gear 63 as viewed from the side portion and the rack gear 63 is so formed to have the plurality of planar tooth tips on the tooth flank 63b, whereby the tooth flank 63b of the rack gear 63 linearly moves in the horizontal plane due to linear movement of the rack plate 60 provided with the rack gear 63 along arrows P and Q (see FIG. 3) in the horizontal plane. Thus, the rotating gear 87 meshed with the rack gear 63 and having the arcuate lower surface (tooth flank) 87d convexed toward the rack gear 63 moves to rotate following linear movement of the rack gear 63, and hence the display screen support member 81 provided with the rotating gear 87 can be rotated in the anteroposterior direction (along arrows C and D in FIG. 1) by the prescribed angle with respect to the vertical plane.

According to this embodiment, the rotating gear 87 and the rack gear 63 are located on the rotation center in rotation of the display screen support member 81 along arrows A and B in the horizontal plane, whereby the meshing state of the rotating gear 87 and the rack gear 63 can be reliably maintained also in a state where the display screen support member 81 rotates in the horizontal plane.

According to this embodiment, the rotating gear 87 and the rack gear 63 are so formed that at least two teeth mesh with corresponding at least two teeth when the display screen support member 81 rotates in the anteroposterior direction (along arrows C and D in FIG. 1) by the prescribed angle with respect to the vertical plane, whereby force can disperse to the teeth of the rotating gear 87 and the teeth of the rack gear 63 as compared with a case where a single tooth meshes with a corresponding single tooth. Thus, the display screen support member 81 can be further stably rotated in the anteroposterior direction by the prescribed angle with respect to the vertical plane.

According to this embodiment, the rotating gear 87 is slidable with respect to the rack gear 63 in the direction perpendicular to the meshing direction (along arrows I and J in FIG. 14) and the rotating gear 87 and the rack gear 63 meshes with each other in a state where the meshing state of the rotating gear 87 and the rack gear 63 is not released while the rack gear 63 and the rotating gear 87 overlap with each other in plan view when the display screen support member 81 rotates in the anteroposterior direction (along arrows C and D in FIG. 1) by the prescribed angle with respect to the vertical plane in the rotational range (along arrows A and B in FIG. 1) in the horizontal plane of the display screen support member 81, whereby the rotating gear 87 is slidable with respect to the rack gear 63 in the direction perpendicular to the meshing direction even when the display screen support member 81 rotates in the horizontal plane, and hence the meshing state of the rotating gear 87 and the rack gear 63 can be maintained in the rotational range in which the display screen support member 81 rotates in the anteroposterior direction by the prescribed angle with respect to the vertical plane. Thus, the display screen support member 81 can be further reliably rotated in the anteroposterior direction by the prescribed angle with respect to the vertical plane.

According to this embodiment, the rack plate 60, which is not fixed to the turntable 31, is arranged on the position between the display screen support member 81 and the turntable 31, whereby the rack gear 63 provided on the rack plate 60 and the rotating gear 87 provided on the display screen support member 81 can be easily meshed with each other. Further, the rack plate 60 is not fixed to the turntable 31, so that linear movement of the rack plate 60 can be always the same direction (along arrows P and Q in FIG. 4). Thus, the rack plate 60 can reliably linearly moves.

According to this embodiment, the rear surface 63c of the rack gear 63 is flatly formed and the central region 61f of the plate member 61 is flatly formed, whereby the rack gear 63 and the rack plate 60 come into surface contact with each other, and hence the rack gear 63 can be further stably rotated in the horizontal plane with respect to the rack plate 60.

According to this embodiment, the upper surface 87a of the rotating gear 87 is flatly formed except portions where the pair of bosses 87b and the screw hole 87c are formed and the lower surface portion 81f of the display screen support member 81 is flatly formed, whereby the upper surface 87a of the rotating gear 87 and the lower surface portion 81f of the display screen support member 81 come into surface contact with each other, and hence the rotating gear 87 and the display screen support member 81 can be further stably fixed.

According to this embodiment, the rotating gear 87 and the rack gear 63 are formed to have rectangular shapes in plan view respectively, and the longitudinal direction of the rotating gear 87 and the longitudinal direction of the rack gear 63 substantially coincide with each other and the central portion of the rotating gear 87 and the central portion of the rack gear 63 substantially coincide with each other in a state where the display screen support member 81 is not rotated in the anteroposterior direction (along arrows C and D in FIG. 1) by the prescribed angle with respect to the vertical plane of the display screen support member 81, whereby the meshing width of the rotating gear 87 and the rack gear 63 can be increased, and hence the display screen support member 81 can be further stably rotated in the anteroposterior direction by the prescribed angle with respect to the vertical plane. The central portion of the rotating gear 87 and the central portion of the rack gear 63 substantially coincide with each other, whereby the region where the rotating gear 87 and the rack gear 63 mesh with each other is increased, and hence the display screen support member 81 can be further stably rotated in the anteroposterior direction by the prescribed angle.

Although the present invention has been described and illustrated in detail, it is clearly understood that the same is by way of illustration and example only and is not to be taken by way of limitation, the spirit and scope of the present invention being limited only by the terms of the appended claims.

For example, the display screen turning apparatus 20 is provided on the liquid crystal television 100 employed as an exemplary television set in the aforementioned embodiment, the present invention is not restricted to this but the display screen turning apparatus may alternatively be provided on another television set having a display body (display panel) such as an organic EL panel other than a liquid crystal panel.

While the rotating gear 87 having the substantial arcuate tooth flank is arranged on the lower surface of the display screen support member 81 and the rack gear 63 having the planar tooth flank is arranged on the upper surface of the rack plate 60 in the aforementioned embodiment, the present invention is not restricted to this but the second gear having the planar tooth flank may be arranged on the lower surface of the display screen support member, and the first gear having the substantially arcuate tooth flank convexed toward the second gear may be arranged on the upper surface of the rack plate.

While the rack gear 62 is meshed with the small-diametral gear portion 55b of the gear 55 in order to linearly move the rack plate 60 along arrows P and Q (see FIG. 3) in the horizontal plane in the aforementioned embodiment, the present invention is not restricted to this but the rack plate may be formed to linearly move in the horizontal plane by mounting a member such as a solenoid linearly movable.

While the stepping motors 42 and 52 are provided as driving sources of the horizontal turning/driving portion 40 and the vertical turning/driving portion 50 in the aforementioned embodiment, the present invention is not restricted to this but both of the horizontal turning driving portion and the vertical turning driving portion may be driven by one driving source.

What is claimed is:

1. A display screen turning apparatus comprising:
   a display screen support member provided with a first gear and supporting a display screen portion;
   a horizontal rotating plate rotatable in a horizontal plane, supporting said display screen support member and rotating said display screen support member in the horizontal plane;
   a vertical support member fixed to said horizontal rotating plate and supporting said display screen support member rotatably in an anteroposterior direction with respect to a vertical plane; and
   a rack plate provided with a second gear meshing with said first gear and moveable linearly in a prescribed direction, regardless of a rotating angle of said horizontal rotating plate in the horizontal plane, wherein
   said second gear is provided rotatably with respect to said rack plate in the horizontal plane, corresponding to a rotating of said horizontal rotating plate in the horizontal plane, and
   said first gear meshed with said second gear moves by movement of said second gear in said prescribed direction following linear movement of said rack plate in said prescribed direction in the horizontal plane, thereby rotating said display screen support member in the anteroposterior direction by a prescribed angle with respect to the vertical plane.

2. The display screen turning apparatus according to claim 1, wherein
   said first gear and said second gear are formed to be located on a rotation center in rotation of said display screen support member in the horizontal plane.

3. The display screen turning apparatus according to claim 1, wherein
   said first gear is fixed so as not to rotate with respect to said display screen support member, and
   said second gear is formed to rotate in the horizontal plane through said first gear following rotation of said display screen support member in the horizontal plane.

4. The display screen turning apparatus according to claim 3, wherein
   said first gear meshed with said second gear is movable in a meshing direction of said first gear and said second gear and slidable with respect to said second gear in a direction perpendicular to said meshing direction following movement of said second gear, in a case where said second gear moves following linear movement of said rack plate in the horizontal plane while a movement direction of said rack plate and said meshing direction of said first gear and said second gear are different from each other by rotating said first gear and said second gear following rotation of said display screen support member in the horizontal plane.

5. The display screen turning apparatus according to claim 1, wherein
   a tooth flank of said first gear is formed to have an arcuate shape convexed toward said second gear as viewed from a side portion, and said second gear is a rack gear having a plurality of flatly formed tooth tips.

6. The display screen turning apparatus according to claim 1, wherein
   said rack plate is arranged on a position between said display screen support member and said horizontal rotating plate while not fixed to said horizontal rotating plate.

7. The display screen turning apparatus according to claim 1, wherein
   at least two teeth of said first gear and at least two teeth of said second gear mesh with each other when said display screen support member rotates in the anteroposterior direction by the prescribed angle with respect to the vertical plane.

8. The display screen turning apparatus according to claim 4, wherein
   direction said first gear is slidable with respect to said second gear along a meshing plane which extends to the direction perpendicular to said meshing direction while meshing of said first gear and said second gear is not released when said display screen support member rotates in the anteroposterior direction by the prescribed angle with respect to the vertical plane in a horizontal rotational range of said display screen support member in the horizontal plane.

9. The display screen turning apparatus according to claim 8, wherein
   said first gear is slidable with respect to said second gear along said meshing plane which extends to the direction perpendicular to said meshing direction while said first gear and said second gear overlap with each other in plan view when said display screen support member rotates in the anteroposterior direction by the prescribed angle with respect to the vertical plane in the horizontal rotational range of said display screen support member in the horizontal plane.

10. The display screen turning apparatus according to claim 9, wherein
    said first gear and said second gear are formed to mesh with each other in the horizontal rotational range of said display screen support member in the horizontal plane and in an anteroposterior rotational range in which said display screen support member rotates in the anteroposterior direction by the prescribed angle with respect to the vertical plane.

11. The display screen turning apparatus according to claim 1, wherein
    said second gear has a cylindrical protrusion formed on a surface opposite to a tooth flank of said second gear, and said rack plate includes a circular hole receiving said protrusion while said second gear is rotatable with respect to said rack plate in the horizontal plane.

12. The display screen turning apparatus according to claim 11, wherein
    said surface opposite to said tooth flank of said second gear except said protrusion is flatly formed to come into surface contact with said rack plate, and a surface of said rack plate corresponding to said surface opposite to said tooth flank of said second gear is flatly formed.

13. The display screen turning apparatus according to claim 5, wherein
    said first gear has a first planar surface portion formed on a surface opposite to said tooth flank having the arcuate shape, and
    said display screen support member is formed on a surface corresponding to said surface opposite to said tooth flank of said first gear and includes a second planar surface portion formed to correspond to said first planar surface portion.

14. The display screen turning apparatus according to claim 3, wherein
said first gear and said second gear are rectangular in plan view, and
a central portion of said first gear and a central portion of said second gear substantially coincide with each other while not rotating in the anteroposterior direction by the prescribed angle with respect to the vertical plane of said display screen support member.

15. A television set comprising:
a display screen portion displaying a television image;
a display screen support member provided with a first gear and supporting said display screen portion;
a horizontal rotating plate rotatable in a horizontal plane, supporting said display screen support member and rotating said display screen support member in the horizontal plane;
a vertical support member fixed to said horizontal rotating plate and supporting said display screen support member rotatably in an anteroposterior direction with respect to a vertical plane; and
a rack plate provided with a second gear meshing with said first gear and moveable linearly in a prescribed direction, regardless of a rotating angle of said horizontal rotating plate in the horizontal plane, wherein
said second gear is provided rotatably with respect to said rack plate in the horizontal plane, corresponding to a rotating of said horizontal rotating plate in the horizontal plane, and
said first gear meshed with said second gear moves by movement of said second gear in said prescribed direction following linear movement of said rack plate in said prescribed direction in the horizontal plane, thereby rotating said display screen support member in the anteroposterior direction by a prescribed angle with respect to the vertical plane.

16. The television set according to claim 15, wherein
said second gear is provided rotatably with respect to said rack plate in the horizontal plane.

17. The television set according to claim 16, wherein
said first gear is fixed so as not to rotate with respect to said display screen support member, and
said second gear is formed to rotate in the horizontal plane through said first gear following rotation of said display screen support member in the horizontal plane.

18. The television set according to claim 17, wherein
said first gear meshed with said second gear is movable in a meshing direction of said first gear and said second gear and slidable with respect to said second gear in a direction perpendicular to said meshing direction following movement of said second gear, in a case where said second gear moves following linear movement of said rack plate in the horizontal plane while a movement direction of said rack plate and said meshing direction of said first gear and said second gear are different from each other by rotating said first gear and said second gear following rotation of said display screen support member in the horizontal plane.

19. The television set according to claim 15, wherein
a tooth flank of said first gear is formed to have an arcuate shape convexed toward said second gear as viewed from a side portion, and said second gear is a rack gear having a plurality of flatly formed tooth tips.

* * * * *